United States Patent
Kuraoka

(10) Patent No.: US 10,147,452 B2
(45) Date of Patent: Dec. 4, 2018

(54) RECORDING APPARATUS, RECORDING METHOD, AND RECORDING MEDIUM

(71) Applicant: SONY CORPORATION, Tokyo (JP)

(72) Inventor: Tomotaka Kuraoka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/564,018

(22) PCT Filed: Mar. 9, 2016

(86) PCT No.: PCT/JP2016/057346
§ 371 (c)(1),
(2) Date: Oct. 3, 2017

(87) PCT Pub. No.: WO2016/189923
PCT Pub. Date: Dec. 1, 2016

(65) Prior Publication Data
US 2018/0144769 A1    May 24, 2018

(30) Foreign Application Priority Data

May 25, 2015 (JP) ................................ 2015-105209

(51) Int. Cl.
*G11B 20/10* (2006.01)
*G11B 7/0045* (2006.01)
(Continued)

(52) U.S. Cl.
CPC ............ *G11B 7/0045* (2013.01); *G11B 7/004* (2013.01); *G11B 20/10* (2013.01); *G11B 20/12* (2013.01);
(Continued)

(58) Field of Classification Search
CPC ..... G11B 7/0935; G11B 7/0956; G11B 19/26; G11B 20/1883; G11B 2220/20;
(Continued)

(56) References Cited

U.S. PATENT DOCUMENTS 8,599,665 B2 * 12/2013 Hwang .............. G11B 20/1217
369/53.15

FOREIGN PATENT DOCUMENTS

JP     2005-251242 A    9/2005
JP     2005-322337 A    11/2005
(Continued)

*Primary Examiner* — Nabil Hindi
(74) *Attorney, Agent, or Firm* — Paratus Law Group, PLLC

(57) ABSTRACT

To realize efficient access in case of restoring read failure data by RMW at time of data rewriting, a recording apparatus includes a write/read unit capable of performing data writing in a second data unit, in which a plurality of first data units of a predetermined amount of data are consecutive, and data reading in the first data unit with respect to a recording medium and a control unit. In response to a rewrite instruction of data, the control unit instructs the write/read unit to generate write data in the second data unit using update data relevant to the rewrite instruction and recorded data read out from the recording medium and to write the write data at a non-recording address on the recording medium, and generates or updates replacement information for associating address at which the write data is written, as a replacement destination, with address of a replacement source.

7 Claims, 15 Drawing Sheets

(51) Int. Cl.
*G11B 20/12* (2006.01)
*G11B 20/18* (2006.01)
*G11B 27/00* (2006.01)
*G11B 7/004* (2006.01)
*G11B 27/10* (2006.01)

(52) U.S. Cl.
CPC .......... *G11B 20/1217* (2013.01); *G11B 20/18* (2013.01); *G11B 20/1883* (2013.01); *G11B 27/00* (2013.01); *G11B 27/102* (2013.01); *G11B 2020/1222* (2013.01); *G11B 2020/1873* (2013.01); *G11B 2220/2541* (2013.01)

(58) Field of Classification Search
CPC .............. G11B 27/36; G11B 20/10037; G11B 20/10046; G11B 2020/1275
USPC ......... 369/53.15, 53.13, 53.17, 59.25, 53.14, 369/47.1, 47.27
See application file for complete search history.

(56) References Cited

FOREIGN PATENT DOCUMENTS

| | | |
|---|---|---|
| JP | 2006-085859 A | 3/2006 |
| JP | 2007-080408 A | 3/2007 |
| JP | 2008-524770 A | 7/2008 |

* cited by examiner

FIG. 4

DMA

| CLUSTER NUMBER | CONTENT | NUMBER OF CLUSTERS |
|---|---|---|
| 1–4 | DDS (SAME CONTENT IS REPEATED FOUR TIMES) | 4 |
| 5–8 | DFL #1 | 4 |
| 9–12 | DFL #2 (SAME CONTENT AS #1) | 4 |
| 13–16 | DFL #3 (SAME CONTENT AS #1) | 4 |
| 17–20 | DFL #4 (SAME CONTENT AS #1) | 4 |
| 21–24 | DFL #5 (SAME CONTENT AS #1) | 4 |
| 25–28 | DFL #6 (SAME CONTENT AS #1) | 4 |
| 29–32 | DFL #7 (SAME CONTENT AS #1) | 4 |

32 CLUSTERS

FIG. 5

DFL (DEFECT LIST)

| BYTE POSITION | CONTENT | NUMBER OF BYTES |
|---|---|---|
| 0 | DEFECT LIST MANAGEMENT INFORMATION | 64 |
| 64 | DFL ENTRY #1 | 8 |
| 72 | DFL ENTRY #2 | 8 |
| | | |
| | DFL ENTRY #N | 8 |
| | DFL ENTRY END | 8 |
| 64 + 8 × N | 00h | |
| | | |
| | 00h | |

4 CLUSTERS

FIG. 9

| | | ENTRY TYPE | REPLACEMENT SOURCE PCN | EX FLAG | REPLACEMENT DESTINATION PCN | | |
|---|---|---|---|---|---|---|---|
| A | CL-A→CL-A' | 0 | CL-A | 0 | CL-A' | | E1 |

| | | ENTRY TYPE | REPLACEMENT SOURCE PCN | EX FLAG | REPLACEMENT DESTINATION PCN | | |
|---|---|---|---|---|---|---|---|
| B | CL-A'→CL-B | 0 | CL-A | 0 | CL-B | | E2 |

| | | ENTRY TYPE | REPLACEMENT SOURCE PCN | EX FLAG | REPLACEMENT DESTINATION PCN | | |
|---|---|---|---|---|---|---|---|
| C | CL-B→CL-C | 0 | CL-A | 0 | CL-C | | E3 |

| | | ENTRY TYPE | REPLACEMENT SOURCE PCN | EX FLAG | REPLACEMENT DESTINATION PCN | | |
|---|---|---|---|---|---|---|---|
| D | CL-C→CL-D | 0 | CL-A | 1 | CL-D | | E4 |
| | | ENTRY TYPE | BITMAP PCN | SUB TYPE | SECTOR BITMAP | | |
| | | 1 | CL-D | 0 | FFFFFF7FF | | E5 |
| | | 1 | CL-D | 1 | 1 | CL-C | E6 |
| | | | | START FLAG | PREVIOUS LOW CLUSTER NUMBER | | |

| | | ENTRY TYPE | REPLACEMENT SOURCE PCN | EX FLAG | REPLACEMENT DESTINATION PCN | | |
|---|---|---|---|---|---|---|---|
| E | CL-D→CL-E | 0 | CL-A | 1 | CL-E | | E7 |
| | | 1 | CL-E | 0 | FF7FFF7FF | | E8 |
| | | 1 | CL-E | 1 | 1 | CL-C | E9 |

| | | ENTRY TYPE | REPLACEMENT SOURCE PCN | EX FLAG | REPLACEMENT DESTINATION PCN | | |
|---|---|---|---|---|---|---|---|
| F | CL-E→CL-F | 0 | CL-A | 1 | CL-F | | E10 |
| | | 1 | CL-E | 0 | FF7FFF7FF | | E8 |
| | | 1 | CL-E | 1 | 1 | CL-C | E9 |
| | | 1 | CL-F | 0 | FFFFFFFE | | E11 |
| | | 1 | CL-F | 1 | 0 | CL-E | E12 |

RECORDING APPARATUS, RECORDING METHOD, AND RECORDING MEDIUM

CROSS REFERENCE TO PRIOR APPLICATION

This application is a National Stage Patent Application of PCT International Patent Application No. PCT/JP2016/057346 (filed on Mar. 9, 2016) under 35 U.S.C. § 371, which claims priority to Japanese Patent Application No. 2015-105209 (filed on May 25, 2015), which are all hereby incorporated by reference in their entirety.

TECHNICAL FIELD

The present technology relates to a recording apparatus, a recording method, and a recording medium, and in particular, to a technical field of data rewriting relevant to a write once type recording medium.

CITATION LIST

Patent Document

Patent Document 1: Japanese Patent Application Laid-Open No. 2006-85859

BACKGROUND ART

Optical recording media, such as a Blu-ray disc (BD; registered trademark) and a digital versatile disc (DVD), are known. For example, write once type optical discs, such as Blu-ray disc recordable (BD-R) and digital versatile disc recordable (DVD-R), are also widely used in these types.

Patent Document 1 discloses a method of rewriting (updating) data with respect to a write once type recording medium.

SUMMARY OF THE INVENTION

Problems to be Solved by the Invention

For example, in the case of the 3D, a data unit of 2048 bytes is called a sector, and 32 sectors (65536 bytes) form a data unit called a cluster. In addition, one cluster is a minimum unit of data writing.

In the case of a write once disc such as a BD-R, it is not possible to rewrite data at the recorded position on the disc. Therefore, rewriting of recorded data is realized by recording data to be updated at another position on the disc and associating the original address with a new address using replacement information. This method is called logical over write (LOW).

For the association of addresses, defect replacement technology is used. That is, the original cluster is treated in the same manner as for a defect, and the replacement source and the replacement destination are managed so as to be linked to each other.

Read modify write (RMW) is required when executing data rewriting in sector units in the LOW.

This is a series of operations for reading the data of a recorded cluster including a sector before executing the sector writing, creating new cluster unit data by merging the data of a sector to be updated with the data of the read sector, and recording the created cluster unit data at the address of the replacement destination. As described above, the cluster is a data writing unit. Therefore, by performing the RMW in this manner, it is possible to record new cluster data obtained by combining sector data for updating with the recorded valid sector data. That is, rewriting in sector units becomes possible.

In this case, however, if it is not possible to acquire the recorded data due to the failure of reading, rewriting cannot be performed in the optimal state. However, even if reading from the cluster of the replacement source simply fails, there is also a possibility that valid sector data can foe acquired from other addresses in a case where rewriting was performed therebefore. Therefore, when reading fails, valid data is searched for retroactively.

However, in order to search for the past valid data, it is necessary to read out data with an address traced back one by one and determine valid sectors. This requires an access time. In addition, in a case where reading to the end is not possible, a read error occurs. This eventually leads to a decrease in the response of the recording apparatus, which may cause a very inconvenient case for the rewriting operation depending on the system.

Therefore, it is an object of the present technology to improve the efficiency of a rewriting operation on a write once type recording medium.

Solutions to Problems

A recording apparatus according to the present technology includes: a write/read unit capable of performing data writing in a second data unit, in which a plurality of first data units of a predetermined amount of data are consecutive, and data reading in the first data unit with respect to a recording medium; and a control unit that, in response to a rewrite instruction for data in the first data unit, instructs the write/read unit to generate write data in the second data unit using update data relevant to the rewrite instruction and recorded data read out from the recording medium and to write the write data at a non-recording address on the recording medium, generates or updates replacement information for associating an address at which the write data is written, as a replacement destination, with an address of a replacement source, and generates extended replacement information including validity/invalidity information for each piece of data in the first data unit in the write data, as information linked to the replacement information, according to predetermined conditions.

It is possible to rewrite data to a so-called write once type recording medium using a method of rewriting data by recording update data at different positions on the recording medium from the recorded data.

Here, in a case where the data writing unit of the write/read unit is set to the second data unit (cluster), it is assumed that there is an instruction of data rewriting in the first data unit (sector) from the host device of the recording apparatus. In order to generate the write data of the second data unit, the recording apparatus reads data of the second data unit including data of the first data unit to be rewritten from the recording medium. Then, an operation of generating write data having the data length of the second data unit by merging data of the first data unit, which is not to be rewritten in the read second data unit, with update data and of writing the write data at the address of the replacement destination is performed. In such a rewriting operation, recorded data is not necessarily read out from the target address. However, in a case where the rewriting operation is performed multiple times, valid recorded data may be present at another address.

By setting the extended replacement information, the presence of valid recorded data for constructing the update data and the address of the valid recorded data can be checked with reference to the management information.

In the above-described recording apparatus, in a case where required recorded data cannot be read out in reading of recorded data from the recording medium in response to the rewrite instruction, the control unit checks other addresses at which the required recorded data is recorded with reference to the extended replacement information and controls the write/read unit to read out data from the other addresses.

Since the address at which valid data as the required recorded data is recorded can be checked with reference to the extended replacement information, it is possible to efficiently try to read out the recorded data by checking other addresses even if the required recorded data cannot be read out from, for example, the address for which a rewrite instruction has been given.

In the above-described recording apparatus, in a case where recorded data required for generating the write data in the second data unit cannot be read out even if reading from all other addresses that can be checked with the extended replacement information is performed, the control unit determines that a read error has occurred.

For example, in a case where the reading from the address for which a rewrite instruction has been given is unsuccessful, it is not determined that a read error has occurred by itself. Then, in a case where the reading from the address checked by the extended replacement information is further tried and the required recorded data cannot be obtained even if the reading from all addresses that can be checked is performed, it is determined that a read error has occurred.

In the above-described recording apparatus, the control unit generates the write data in the second data unit by combining the update data relevant to the rewrite instruction and the read recorded data in a case where reading of the required recorded data from the recording medium is successful, and generates the write data in the second data unit by combining the update data relevant to the rewrite instruction and invalid data in a case where it is determined that the read error has occurred.

In a case where required recorded data cannot be read out, at least the rewrite data relevant to the rewrite instruction is written.

In the above-described recording apparatus, the control unit generates the extended replacement information on condition that it is determined that the read error has occurred.

Even in a case where a read error occurs, the writing of rewrite data is performed. Therefore, for the address at which a read error has occurred, extended replacement information is generated and registered so that the past recorded data can be traced thereafter.

In the above-described recording apparatus, the control unit maintains both existing extended replacement information and the generated extended replacement information in a case where there is extended replacement information for recorded data whose reading has been unsuccessful.

By allowing the new extended replacement information and the existing extended replacement information to coexist, the recorded data can be traced using the extended replacement information including the past read error.

In the above-described recording apparatus, in a case where writing of the write data, which is generated by combining the update data relevant to the rewrite instruction and the recorded data, to the recording medium is performed, the control unit generates extended replacement information including the validity/invalidity information of existing extended replacement information and deletes the existing extended replacement information on condition that the extended replacement information for the recorded data is present.

In a case where the extended replacement information was generated in response to a read error in the past even if the reading of the recorded data is successful and rewriting can be appropriately executed, extended replacement information merged with the existing extended replacement information is generated so that recorded data can be traced including the past read error. In this case, since the existing extended replacement information is not necessary, the existing extended replacement information is deleted.

In the above-described recording apparatus, in a case where a plurality of the second data units whose addresses can be checked with reference to the extended replacement information are physically continuous on the recording medium, the control unit controls the write/read unit to continuously read out data from the plurality of consecutive second data units.

If the second data units that can be traced back for the reading of recorded data are physically continuous, the plurality of second data units are accessed and read out at once.

In the above-described recording apparatus, the control unit instructs the write/read unit to write management data including the replacement management information and the extended replacement management information to the recording medium.

By writing the management data including the replacement management information and the extended replacement management information to the recording medium, it is also possible to respond to the ejection of the recording medium and other recording apparatuses.

In the above-described recording apparatus, the control unit generates or updates the replacement information so that an address of a latest replacement destination corresponds to an address of a replacement source in a first rewriting operation, and the control unit generates, as the extended replacement information, first extended replacement information including an address of the second data unit, which is a replacement destination in a rewriting operation, and validity/invalidity information of each piece of data of the first data unit in the second data unit and second extended replacement information including an address of the second data unit, which is a replacement destination in a rewriting operation, and an address of a replacement destination in a previous rewriting operation.

With this structure, functions as the replacement information and the extended replacement information are realized.

A recording method according to the present technology is a recording method of a recording apparatus including a write/read unit capable of performing data writing in a second data unit, in which a plurality of first data units of a predetermined amount of data are consecutive, and data reading in the first data unit with respect to a recording medium, the method including: a step in which, in response to a rewrite instruction for data in the first data unit, the write/read unit is instructed to generate write data in the second data unit using update data relevant to the rewrite instruction and recorded data read out from the recording medium and to write the write data at a non-recording address on the recording medium; a step of generating or updating replacement information for associating an address at which the write data is written, as a replacement destination, with an address of a replacement source; and a step of generating extended replacement information including validity/invalidity information for each piece of data in the first data unit in the write data, as information linked to the replacement information, according to predetermined conditions.

That is, by setting the extended replacement information when necessary, the presence of valid recorded data for constructing the update data and the address of the valid recorded data can be checked with reference to the management information.

A recording medium according to the present technology is a recording medium in which user data and management data are recorded, data writing in a second data unit in which a plurality of first data units of a predetermined amount of data are consecutive is performed, and write data of the second data unit is written to a non-recording address by update data and recorded data at the time of rewriting data of the first data unit, in which a management information area is provided to record management data including replacement information for associating an address at which write data is written, as a replacement destination, with an address of a replacement source by a data rewriting operation, and extended replacement information, which is information linked to the replacement information and which includes validity/invalidity information for each piece of data of the first data unit in the write data.

By forming a recording medium in which extended replacement information is recordable in the management information area, the recording apparatus can check the presence of valid recorded data for constructing update data or the address of the valid recorded data with reference to the management data at the time of data rewriting.

Effects of the Invention

According to the present technology, since it is possible to improve the efficiency of the rewriting operation on the write once type recording medium, a recording apparatus with a good response can be realized.

In addition, the effects described herein are not necessarily limited, and any of the effects described in the present disclosure may be applied.

BRIEF DESCRIPTION OF DRAWINGS

FIG. 4 is an explanatory diagram of a DMA of the disc of the embodiment.

FIG. 5 is an explanatory diagram of a DFL of the embodiment.

FIG. 9 is an explanatory diagram of the content of an extension entry according to the rewriting operation of the embodiment.

MODE FOR CARRYING OUT THE INVENTION

Hereinafter, an embodiment will be described in the following order.
<1. Disc structure>
<2. DMA and DFL entry>
<3. Configuration of a disc drive apparatus>
<4. Data rewriting processing>
<5. Summary and modifications>
<1. Disc Structure>

In an embodiment, a write once type disc (BD-R) in the category of a high-density optical disc system called a so-called Blu-ray disc is mentioned as an example of a recording medium referred to in the claims.

An example of the physical parameters of the high-density optical disc of the present embodiment will be described.

In the optical disc of this example, the disc size is 120 mm in diameter and 1.2 mm in disc thickness.

In addition, as a laser for recording/reproducing, a so-called blue laser is used, and the optical system has a high NA (for example, NA=0.85). In addition, a narrow track pitch (for example, track pitch=0.32 μm) and a high linear density (for example, recording linear density of 0.12 μm) are realized. As a result, about 23 G to 25 GB (Giga Byte) is realized as a user data capacity in a disc having a diameter of 12 cm. In addition, by further high-density recording, a capacity of about 30 GB is also possible.

In addition, a so-called multi-layer disc having a plurality of recording layers has been developed. In the case of a multi-layer disc, the user data capacity is almost proportional to the number of layers.

Figure 1:
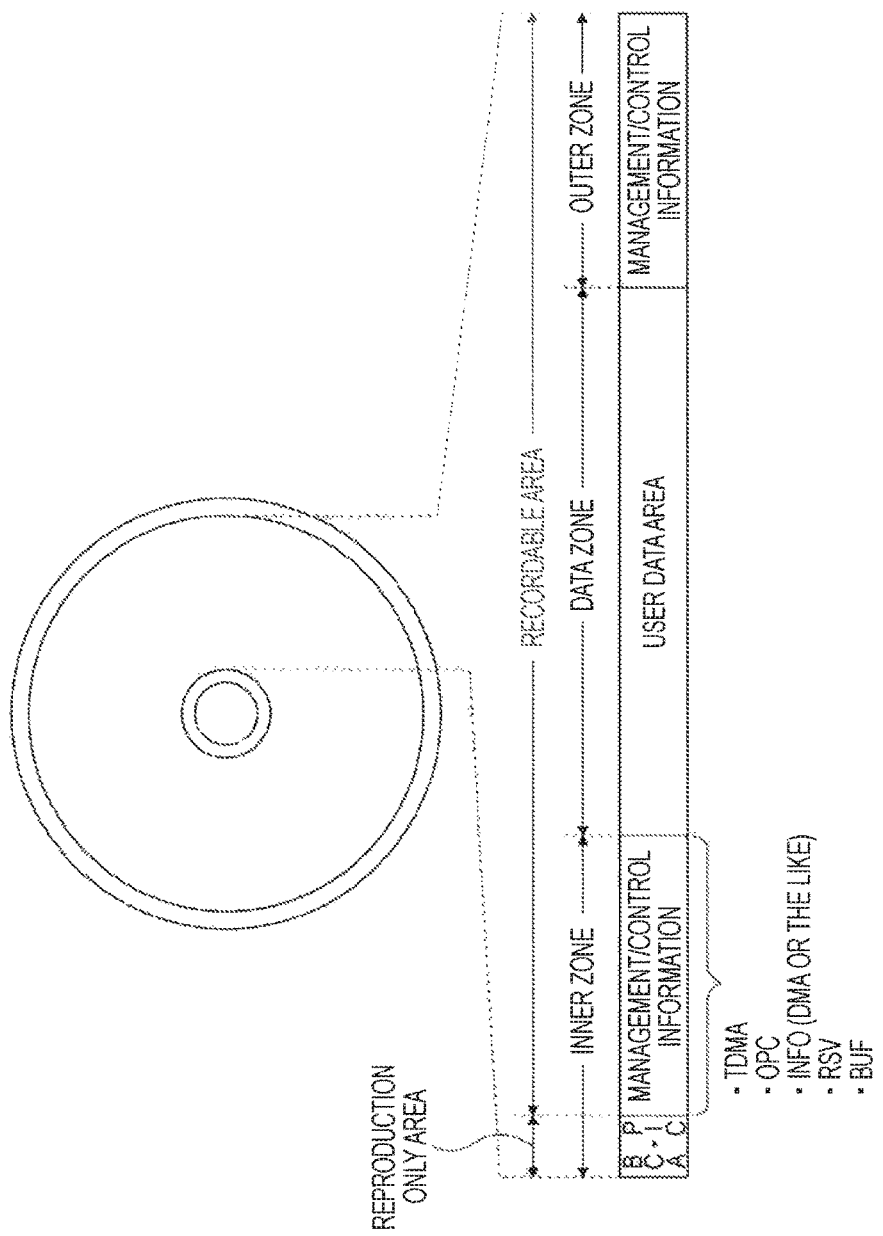
FIG. 1 is an explanatory diagram of the area structure of a disc of an embodiment of the present technology.

FIG. 1 shows the layout (area configuration) of the entire disc.

As areas on the disc, an inner zone, a data zone, and an outer zone are arranged from the inner peripheral side.

In addition, in FIG. 1, a structure (single layer) having one recording layer is shown. In this case, the inner zone is a lead-in area, and the outer zone is a lead-out area. For the sake of convenience of explanation, also in the case of a multi-layer disc, the inner peripheral side area of each recording layer is collectively referred to as an inner zone and the outer peripheral side area of each recording layer is collectively referred to as an outer zone.

In terms of the configuration of an area relevant to recording and reproducing, an area on the innermost peripheral side of the inner zone (lead-in area) is a reproduction only area and an area from the inner zone to the outer zone is a recordable area.

A burst cutting area (BCA) or a pre-recorded information area (PIC) is provided in the reproduction only area. Although the inner zone structure of a multi-layer disc having two or more layers will be described later, the PIC is only the first layer (layer L0), and a portion having the same radius as the PIC in a recording layer from the second layer (layer L1) is a recordable area.

In addition, in the inner zone, the recordable area is used for various kinds of management/recording of control information.

Recording tracks formed by wobbling grooves (meandering grooves) are formed in a spiral shape in the reproduction only area and the recordable area. Each groove serves as a guide for tracking at the time of tracing by the laser spot, and the groove is used as a recording track so that data is recorded and reproduced.

In addition, in this example, an optical disc in which data is recorded in grooves is assumed. However, the invention is not limited to such a groove recording optical disc, but may be applied to a land recording type optical disc in which data is recorded in a land between grooves. In addition, the invention can also be applied to a land groove recording type optical disc in which data is recorded in grooves and lands.

In addition, the groove serving as a recording track has a meandering shape corresponding to a wobble signal. Therefore, in a disc drive apparatus for an optical disc, the wobble signal can be reproduced by detecting both edge positions of a groove from the reflected light of the laser spot emitted, to the groove and extracting a change component of both the edge positions with respect to the disc radius direction when the laser soot is moved along the recording track.

In the wobble signal, address information (physical address, other additional information, or the like) of the recording track at the recording position is modulated. Therefore, in the disc drive apparatus, it is possible to perform address control or the like at the time of recording or reproducing data by demodulating the address information or the like from the wobble signal.

In the case of the BD, a data unit of 2048 bytes is called a sector, and 32 consecutive sectors (65536 bytes) form a data unit called a cluster. In addition, one cluster is a minimum unit of data writing.

In this case, the sector corresponds to a first data unit referred to in the claims, and the cluster corresponds to a second data unit.

In the disc drive apparatus for an optical disc, writing is performed on a recording track in cluster units. Data reading can be performed in sector units.

The inner zone shown in FIG. 1 is, for example, an area inside a radius of 24 mm.

In addition, in the pre-recorded information area (PIC) in the inner zone, disc information such as recording/reproducing power conditions, area information on the disc, information used for copy protection, and the like are recorded in advance as reproduction-only information by wobbling of grooves. In addition, the pieces of information may be recorded by embossed pits or the like.

In addition, the BCA is provided on the further inner peripheral side from the PIC. In the BCA, a unique ID that is unique to the disc recording medium is recorded, for example, in a recording method of burning out the recording layer. That is, recording marks are formed so as to be arranged concentrically, thereby forming bar code-like recording data.

In addition, in the inner zone, a predetermined area format having a temporary defect management area (TDMA), an optimum power control area (OPC), an information area (INFO), a reserved area RSV, a buffer area BUF, and the like is set.

The OPC is used for trial writing or the like when setting data recording/reproducing conditions, such as laser power at the time of recording/reproducing. That is, the OPC is an area for adjusting the recording/reproducing conditions.

The INFO includes a defect management area (DMA) or a control data area. In the control data area of the INFO, for example, a disc type, a disc size, a disc version, a layer structure, a channel bit length, BCA information, a transfer rate, data zone position information, recording linear velocity, recording/reproducing laser power information, and the like are recorded.

In the INFO, the DMA is provided. However, in the field of optical discs, replacement information for defect management (DFL to be described later) is usually recorded in the DMA. In the disc of this example, however, management/control information for realizing not only the replacement management of defective portions but also data rewriting in the write once type disc is recorded in the DMA.

In addition, in order to enable data rewriting using replacement processing, the content of the DMA should also be updated according to data rewriting. For this reason, the TDMA is provided.

The replacement information is additionally recorded in the TDMA and is updated. The last (latest) replacement information finally recorded in the TDMA is recorded in the DMA.

The DMA and the TDMA will be described later.

For example, a radius of 24.0 to 58.0 mm on the outer peripheral side from the inner zone is a data zone. The data zone is an area where user data is actually recorded and reproduced. The start address and the end address of the data zone are indicated in the data cone position information of the control data area described above.

The data zone is a user data area, and is used for recording/reproducing of user data.

For example, a radius of 58.0 to 58.5 mm on the outer peripheral side from the data zone is an outer zone (for example, a read-out zone). Management/control information is also recorded in the outer zone. That is, the INFO (the control data area, the DMA, and the buffer area) is formed in a predetermined format.

Various kinds of management/control information are also recorded in the control data area of the outer zone, for example, in a manner similar to the control data area in the inner zone.

Figure 2:
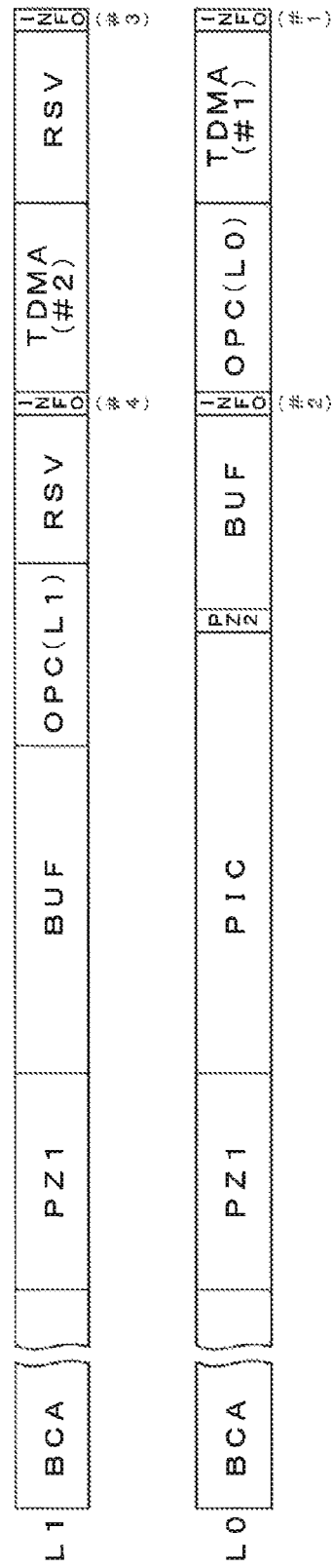
FIG. 2 is an explanatory diagram of an inner zone of a two-layer BD-R of the embodiment.
Figure 3:
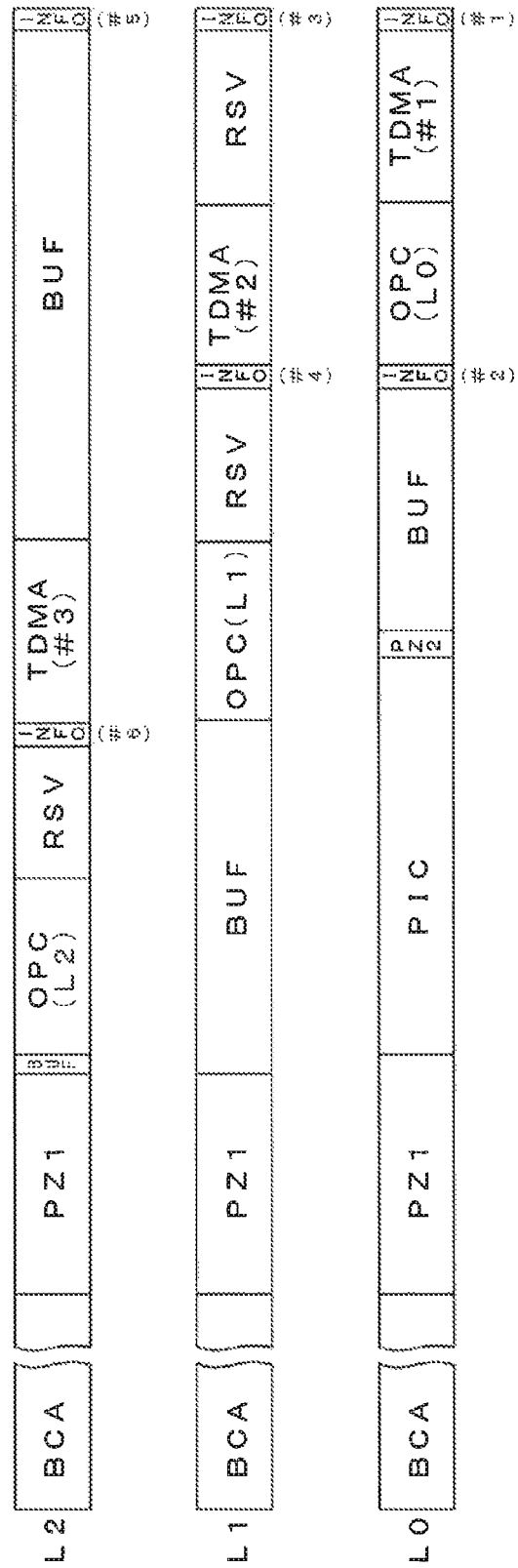
FIG. 3 is an explanatory diagram of an inner zone of a three-layer BD-R of the embodiment.

As an example of a multi-layer disc, a layout example of an inner zone of a two-layer disc is shown in FIG. 2, and a layout example of an inner zone of a three-layer disc is shown in FIG. 3.

In the case of the two-layer disc shown in FIG. 2, a protection zone PZ1 is provided in each of layers L0 and L1 in order to separate the BCA from the area for recording/reproducing of management information.

In the layer L0, as described above, the PIC where management information for reproduction only is recorded in the wobbling groove is formed. In addition, a protection zone PZ2, a buffer area BUF, INFO#2, OPC (L0), TDMA#1, and INFO#1 are sequentially arranged from the PIC toward the outer peripheral side.

In the layer L1, a buffer area BUF, OPC (L1), a reserved area RSV, INFO#4, TDMA#2, a reserved area RSV, and INFO#3 are sequentially arranged.

In addition, the buffer area BUF is an area that is not used for recording/reproducing of management information. In addition, the reserved area RSV is an area that is not currently used but may be used for recording/reproducing of management information in the future.

Although the TDMA and the INFO are shown with #1 to #n attached thereto, these are used as one TDMA area and one INFO area as a whole regardless of the arrangement layer.

In the case of the three-layer disc shown in FIG. 3, in the layer L0, the PIC is arranged on the outer peripheral side subsequent to the BCA and the protection zone PZ1. The BCA, the protection zone PZ, and the PIC are the reproduction only area.

In addition, subsequent to the PIC, a protection zone PZ2, a buffer area BUF, INFO#2, OPC (L0), TDMA#1, and INFO#1 are arranged toward the outer peripheral side.

In the layer L1, only the BCA and the protection zone PZ1 are the reproduction only area. In addition, subsequent to the protection zone PZ1, a buffer area BUF, OPC (L1), a reserved area RSV, INFO#4, TDMA#2, a reserved area RSV, and INFO#3 are arranged toward the outer peripheral side.

Also in the layer L2, only the BCA and the protection cone PZ1 are the reproduction only area. In addition, subsequent to the protection zone PZ1, a buffer area BUF, OPC (L2), a reserved area RSV, INFO#6, TDMA#3, a buffer area BUF, and INFO#5 are arranged toward the outer peripheral side.

In addition, the above layouts shown in FIGS. 2 and 3 are examples. As the optical disc of the present embodiment, any optical disc may be used in which a region where a DFL entry, which will be described later, can be stored is prepared even if the layout of the inner zone is different from those shown in FIGS. 2 and 3.

<2. DMA and DFL Entry>

The structure of the DMA recorded in the inner zone and the outer zone will be described. FIG. 4 shows the structure of the DMA.

Here, an example is shown in which the size of the DMA is 32 clusters (32×65536 bytes). In addition, the cluster is a minimum unit of data recording.

Needless to say, the DMA size is not limited to 32 clusters. In FIG. 4, each cluster of 32 clusters is indicated as cluster numbers 1 to 32, and the data position of each content in the DMA is shown. In addition, the size of each content is shown as the number of clusters.

In the DMA, detailed information of the disc is recorded as disc definition structure (DOS) in a section of four clusters of the cluster numbers 1 to 4.

Area management information of the user data area is recorded in the DDS. The DDS has a size of one cluster, and is repeatedly recorded four times in the section of four clusters.

The section of four clusters of cluster numbers 5 to 8 is the first recording area (DFL#1) of a defect list DFL. The defect list DFL is data having a size of four clusters, and information (DFL entry to be described later) indicating the individual replacement status is listed up therein.

The section of four clusters of cluster numbers 9 to 12 is the second recording area (DFL#2) of the defect list DFL.

In addition, recording areas of four clusters, that is, the third and subsequent defect lists DFL#3 to DFL#6 are prepared, and the section of four clusters of the cluster numbers 29 to 32 is the seventh recording area (DFL#7) of the defect list DFL.

That is, seven recording areas of the defect lists DFL#1 to DFL#7 are prepared in the DMA of 32 clusters.

In the case of the BD-R (write once type optical disc), in order to record the content of the DMA, it is necessary to perform processing called closing. In this case, all of the seven defect lists DFL#1 to DFL#7 to be written in the DMA have the same content. The content of writing is the content of the latest TDMA.

The content of the DOS or the defect list DFL needs to be sequentially updated according to data rewriting or the like.

In this case, however, information almost similar to the DMA content is recorded in the TDMA. In addition, the latest content of the TDMA is the content of the DMA at the present time (or closing time).

FIG. 5 shows the structure of the defect list DFL.

As described with reference to FIG. 4, the defect list DFL is recorded in the recording area of four clusters.

In FIG. 5, the data position of each data content in the defect list DFL of four clusters is shown as a byte position. In addition, 1 cluster=32 sectors=65536 bytes, and 1 sector=2048 bytes.

The number of bytes indicates the number of bytes as the size of each data content.

The first 64 bytes of the defect list DFL are defect list management information.

As the defect list management information, information for recognizing the cluster of the defect list and information, such as a version, the number of defect list updates, and the number of entries of the defect list, are recorded.

In addition, after the byte position 64, DFL entries of 8 bytes are recorded as the entry content of the defect list, that is, specific replacement address information.

In addition, immediately after the last valid DFL entry #N, 8 bytes of terminator information as the DFL entry end are recorded.

In the DFL, after the end of the DFL entry, a region up to the end of the cluster is filled with 00h.

Figure 6:
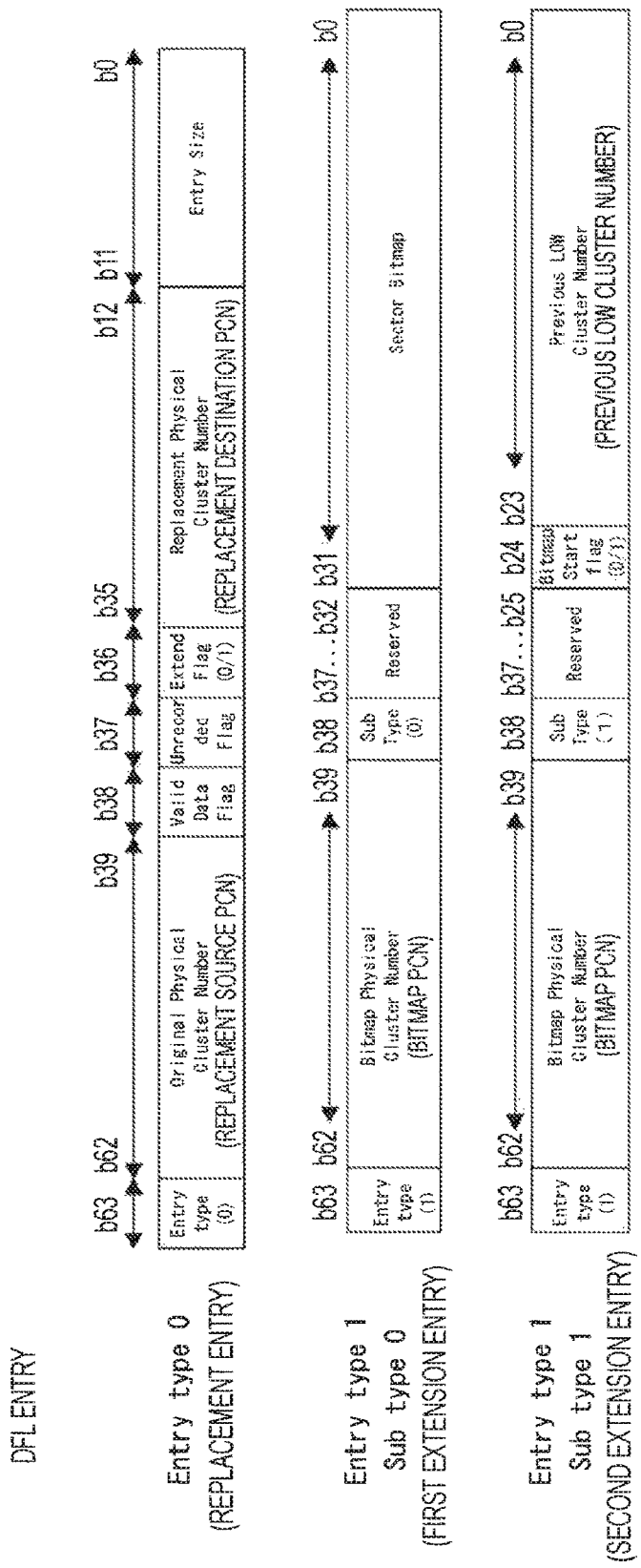
FIG. 6 is an explanatory diagram of a DFL entry of the embodiment.

FIG. 6 shows the structure of the DFL entry.

In the present embodiment, since the BD-R is a write once disc, data rewriting cannot be performed at a recorded position on the disc. Therefore, data rewriting is performed using a method called the LOW. That is, for the rewriting of recorded data, update data is recorded at another position on the disc, and the original address is associated with a new address using replacement information.

A specific example of the replacement information is a DFL entry.

In the present embodiment, two types of entry types "0" and "1" are defined as the DFL entry. In addition, for the entry type "1", sub types "0" and "1" are further defined. As a result, three types of DFL entries shown in FIG. 6 are defined.

The DFL entry of the entry type "0" is an entry as normal replacement information.

On the other hand, DFL entries of the sub types "0" and "1" as the entry type "0" are entries as extended replacement information.

In the following description, for the sake of distinction, the DFL entry of the entry type "0" will be referred to as a "replacement entry", and the DFL entries of the sub types "0" and "1" as the entry type "0" will be referred to as "extension entries". In addition, the extension entry of the sub type "0" is referred to as a "first extension entry", and the extension entry of the sub type "1" is referred to as a "second extension entry".

One DFL entry is configured to include 8 bytes (64 bits). The respective bits are shown as bits b63 to b0.

First, the DFL entry (replacement entry) of the entry type "0" as normal replacement information will be described. Entry type "0" is recorded in the bit b63 of the replacement entry.

The physical address (physical cluster number: PCN) of the replacement source cluster is shown in the bits b62 to b38 (replacement source PCN). That is, a cluster that is replaced due to a defect or rewriting is shown.

A valid data flag is recorded in the bit b38. This is information indicating whether or not dummy write is registered.

An unrecorded flag is recorded in the bit b37. This is information indicating whether or not an unrecorded defect is registered.

An extend flag is recorded in the bit b36. This is information indicating whether or not there is an extension entry (DFL entry of entry type "1") linked to the entry.

Usually, the extend flag is set to 0. However, as will be described later, depending on the situation of rewriting operation, there is a case where an extension entry is generated in a state in which the extension entry is linked to the replacement entry. In this case, the extend flag of the replacement entry is set to 1.

The physical address (PCN) of the replacement destination cluster is shown in the bits b35 to b12 (replacement destination PCN). That is, the bits b35 to b12 indicate a cluster of the replacement destination in a case where the cluster is replaced due to a defect or rewriting.

That is, in one replacement entry, replacement address information is formed in a format showing the relationship between the replacement source PCN and the replacement destination PCN.

Entry size is shown in the bits b11 to b0. If one cluster is replaced, entry size=0. In a case where replacement is performed in an area where two or more clusters are consecutive, the number of consecutive clusters is shown according to the entry size.

For example, the case of entry size=1 shows that two clusters with a replacement source cluster at the head are replaced with two clusters with a replacement destination cluster at the head. The case of entry size=2 snows that three clusters with a replacement source cluster at the head are replaced with three clusters with a replacement destination cluster at the head.

By managing such an entry size, it is not necessary to generate a replacement entry for each cluster when a plurality of consecutive clusters are replaced.

Next, a first extension entry (entry type "1", sub type "0") will be described.

Entry type "1" is recorded in the bit b63 of the first extension entry.

Information (bitmap PCN) of the address (PCN) of a cluster indicating the sector bitmap in the first extension entry is shown in the bits b62 to b39. As the bitmap PCN, a replacement destination PCN in the linked replacement entry is assigned.

Sub type "0" is recorded in the bit b38.

Bits b37 to b32 are reserved.

32 bits of bits 31 to b0 are set as a sector bitmap. This is information indicating a valid sector or art invalid sector with each 1 bit for each of 32 sectors forming the cluster indicated by the bitmap PCN. For example, "0" is a valid sector, and "1" is an invalid sector.

By referring to the sector bitmap, it is possible to check whether each of 32 sectors in the cluster indicated by the bitmap PCN is valid or invalid.

Next, a second extension entry (entry type "1", sub type "1") will be described.

Entry type "1" is recorded in the bit b63 of the second extension entry.

In a manner similar to the first extension entry described above, the bitmap PCN indicating the replacement destination PCN in the linked replacement entry is shown in the bits b62 to b39.

Sub type "1" is recorded in the bit b38.

Bits b37 to b32 are reserved.

A bitmap start flag is recorded in the bit b24. This is information indicating the first extension entry linked to a certain replacement entry. In a case where extension entries (first and second extension entries) linked to the replacement entry are registered, along with a certain data rewriting operation (LOW), the bitmap start flag is set to 1. This indicates the first information of the sector bitmap (extension entry cannot be traced back any more).

In a case where an extension entry is added according to the subsequent data rewriting operation, the bitmap start flag in the extension entry is set to 0. This indicates that there is a previous extension entry (being traced back in the case of RMW).

A previous LOW cluster number is recorded in the bits b23 to b0. This indicates the replacement destination PCN at the time of LOW in which the RMW was successful previously in view of the current LOW in which the second extension entry has been registered. This is information indicating the cluster traced back in the case of RMW.

With the first and second extension entries described above, in the case of RMW, even if reading from the PCN serving as the replacement source fails this time, it is possible to check the presence of valid sector data in other PCNs.

In the present embodiment, RMW is performed when performing data rewriting in sector units in the LOW. As described above, the RMW is a series of operations for reading the data of a cluster including a sector before executing the sector writing, creating new cluster unit data by merging the data (update data) of a sector to be updated with the data (recorded data) of the read sector, and recording the created cluster unit data at the address of the replacement destination.

Here, the first extension entry is registered together with the replacement entry at the time of RMW failure or thereafter. In this case, the sector bitmap is optimized (merged) and registered.

The second extension entry is registered as an entry including the previous replacement destination PCN together with the replacement entry at the time or RMW failure or thereafter. In the case of the first registration, the bitmap start flag is set to 1 as described above.

An extension entry is added according to the following rules (a), (b) and (c).

(a) In a case where there is no extension entry

The first and second extension entries are registered at the time of read failure of RMW for the sector write target cluster.

(b) In a case where the RMW is successful in a case where there is an extension entry The first extension entry having a sector bitmap obtained by merging the sector write information at that time with the previous sector bitmap is registered. In addition, the second extension entry is added with the previous LOW cluster number and the bitmap start flag=1, and the previous extension entry is deleted.

(c) In a case where the RMW fails in a case where there is an extension entry

The first and second extension entries are added with only the sector write information at that time valid, and the previous extension entry is saved as it is.

Figure 7:
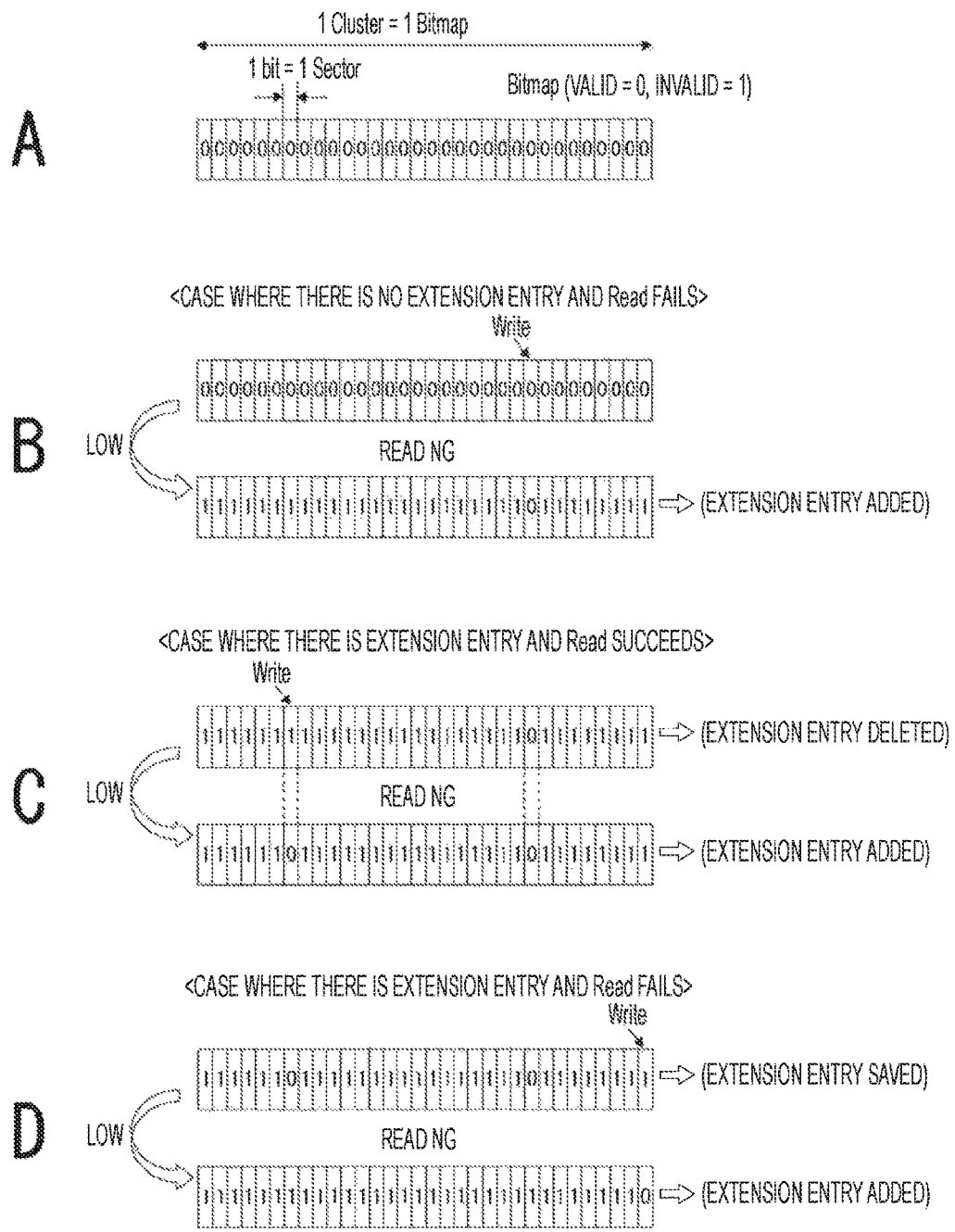
FIG. 7 is an explanatory diagram of additional opportunities of extension entries of the embodiment.

An example of a sector bitmap of a first extension entry in an extension entry added according to such a rule will be described with reference to FIG. 7.

FIG. 7A shows 32 bits as a sector bitmap. If all sectors of the target cluster are valid sectors, all 32 bits are "0".

However, such a status is a state at the time of successful reading of RMW without an extension entry, and does not correspond to the above-described rule and no extension entry is formed. In practice, therefore, an extension entry having such a sector bitmap is not present.

FIG. 7B shows a sector bitmap of an extension entry formed in a case corresponding to the above (a).

Now, it is assumed that a sector indicated by the arrow Write in the upper part of FIG. 7B is a rewriting (sector write) target. At this time, it is assumed that RMW reading has failed. The data of the rewriting target sector, that is, update data supplied from the host, is recorded in the replacement destination cluster indicated by the replacement entry updated according to the current LOW. However, due to the read failure of the RMW, sectors other than the sector of the update data are invalid data. Therefore, as shown in the lower part, the sector bitmap is information indicating that only the sector in which the update data is recorded is valid and the other sectors are invalid sectors.

FIG. 7C shows a sector bitmap of an extension entry formed in a case corresponding to the above (b).

The upper part of FIG. 7C shows the state of the lower part of FIG. 7B. Here, it is assumed that the sector indicated by the arrow Write is a sector writing target. At this time, it is assumed that RMW reading is successful. Then, since the sector in which the update data was previously recorded and the sector in which the update data is currently recorded are valid, the sector bitmap is as shown in the lower part. That is, a sector bitmap is obtained in which the information of the current valid sector and the information of the valid sector up to the previous time are merged. In this case, since the previous sector bitmap is not necessary, the previous extension entry is deleted and the bitmap start flag is set to 1.

FIG. 7D shows a sector bitmap of an extension entry formed in a case corresponding to the above (c).

The upper part of FIG. 7D shows the state of the lower part of FIG. 7C. Here, it is assumed that the sector indicated by the arrow Write is a sector writing target.

At this time, it is assumed that RMW reading has failed. The update data of the rewriting target sector is recorded in the replacement destination cluster indicated by the replacement entry updated, according to the current LOW. However, due to read failure, sectors other than the sector in which the update data is recorded are invalid data. Therefore, as shown in the lower part, the sector bitmap is information indicating that only the sector in which the update data is recorded is valid and the other sectors are invalid sectors. On the other hand, since the sector bitmap of the previous extension entry has information of other valid sectors, the sector bitmap of the previous extension entry can be saved so as to be referred to.

The transition of DFL entries (a replacement entry, a first extension entry, and a second extension entry) according to the LOW, which occurs due to such a sector bitmap transition, will be described with reference to FIGS. 8 and 9.

Figure 8:
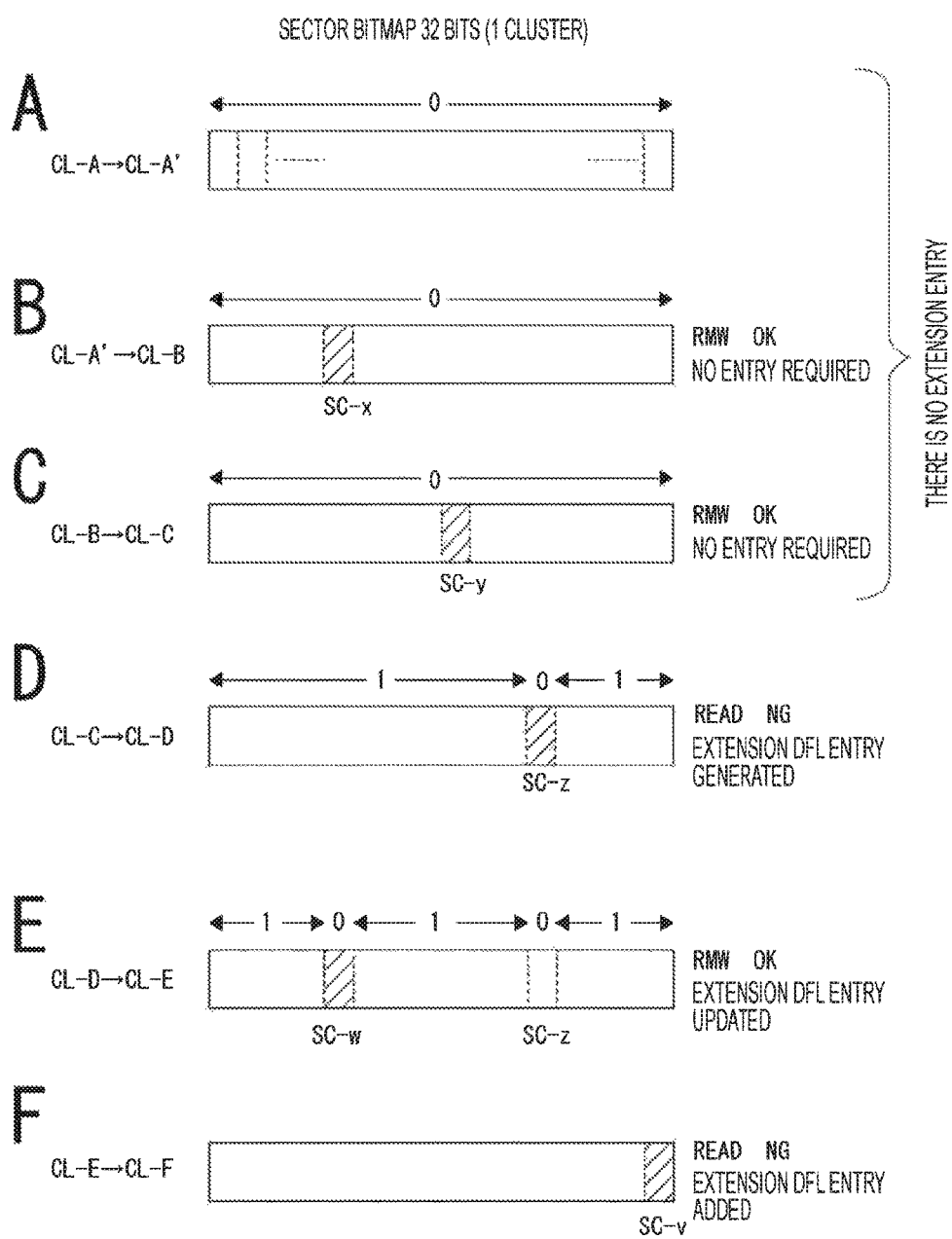
FIG. 8 is an explanatory diagram of a rewriting operation and a bitmap of an extension entry of the embodiment.

FIG. 8 shows the replacement of a cluster and the transition of a sector bitmap, and FIG. 9 shows the state of a DFL entry at each point in time.

In FIGS. 8 and 9, a case where data rewriting is repeated several times for an original cluster CL-A and the address (PCN) of the replacement destination transitions like the cluster CL-A→CL-A'→CL-B→CL-C→CL-D→CL-E→CL-F is mentioned as an example.

FIGS. 8A and 9A show states after the LOW according to the transition from the cluster CL-A to CL-A'. It is assumed that the RMW in the LOW in this case is performed normally.

Therefore, since all the sectors of cluster CL-A' are valid, the sector bitmap in FIG. 8A is all "0" (however, since no extension entry is registered at this point in time, the sector bitmap is not present).

As the DFL entry, a replacement source PCN(=CL-A) and a replacement destination PCN(=CL-A') are shown by a replacement entry E1 (entry type "0") as shown in FIG. 9A.

Since no rules (a), (b), and (c) described above are satisfied, no extension entry is generated and the extend flag is set to 0.

FIGS. 8B and 9B show states after the LOW according to the transition from the cluster CL-A' to CL-B. It is assumed that a sector SC-x shown in FIG. 8B is a rewriting target.

It is assumed that the RMW in the LOW in this case is performed normally. Therefore, since all the sectors of cluster CL-B are valid, the sector bitmap in FIG. 8B is all "0" (however, there is no sector bitmap at this point in time as well).

As the DFL entry, a replacement entry E2 (entry type "0") in FIG. 9B is generated, and the replacement source PCN(=CL-A) and a replacement destination PCN(=CL-B) are shown by the replacement entry E2. That is, the replacement destination PCN of the replacement entry E1 in FIG. 9A is updated.

In addition, the replacement entry E1 is deleted at this point in time. This is because the replacement entry should be information indicating one replacement destination PCN for one replacement source PCN. That is, this is because the correct latest replacement destination is not clear if the replacement entries E1 and E2 coexist.

FIGS. 8C and 9C show states after the LOW according to the transition from the cluster CL-B to CL-C.

It is assumed that a sector SC-y is an update target. It is assumed that the RMW in the LOW in this case is performed normally. Therefore, since all the sectors of cluster CL-C are valid, the sector bitmap in FIG. 8C is all "0" (however, there is no sector bitmap at this point in time as well).

As the DFL entry, a replacement entry E3 (entry type "0") in FIG. 9C is generated, and the replacement source PCN(=CL-A) and a replacement destination PCN(=CL-C) are shown by the replacement entry E3. That is, the replacement destination PCN of the replacement entry E2 is updated. The replacement entry E2 is deleted.

FIGS. 8D and 9D show states after the LOW according to the transition from the cluster CL-C to CL-D. It is assumed that a sector SC-z is an update target.

In this case, it is assumed that RMW reading has failed. In the sectors of the cluster CL-D, only the rewriting target sector SC-z is valid. Accordingly, as shown in FIG. 8D, the sector bitmap is set to "0" only for the sector SC-z and to "1" indicating "invalid" for the other sectors.

As the DFL entry, a replacement entry E4 (entry type "0") in FIG. 9D is generated, and the replacement source PCN(=CL-A) and a replacement destination PCN CL-D) are shown by the replacement entry E4. The replacement entry E3 is deleted.

Then, since the above-described rule (a) is satisfied, a first extension entry E5 and a second extension entry E6 are registered so as to be linked to the replacement entry E4. Accordingly, the extend flag in the replacement entry E4 is set to 1.

The content of the first extension entry E5 is the entry type "1", bitmap PCN=CL-D, sub type "0", and the sector bitmap of the state shown in FIG. 8D.

The content, of the second extension entry E6 is the entry type "1", bitmap PCN=CL-D, sub type "1", start flag=1, and previous LOW cluster number=CL-C. Start flag=1 indicates the first extension entry linked to the replacement entry E4. In addition, previous LOW cluster number=CL-C indicates that the destination (replacement destination PCN at the time of LOW in which the RMW was successful previously) traced back to collect valid sector data is the cluster CL-C.

At a point in time after the DFL entry has reached the state of FIG. 9D, a valid sector in the cluster CL-D can be determined with reference to the first extension entry E5. In addition, with reference to the second extension entry E6, it is possible to determine that the data of a valid sector can be collected by tracing back to the cluster CL-C.

Since the bitmap PCN is CL-D, the extension entries E5 and E6 are linked to the latest replacement entry E4. That is, searching from the replacement destination PCN of the latest replacement entry E4 is possible.

FIGS. 8E and 9E show states after the LOW according to the transition from the cluster CL-D to CL-E. It is assumed chat a sector SC-w is an update target.

In this case, it is assumed that RMW reading is successful. For example, it is assumed that required sector data, that is, sector data other than the sector SC-w, can be read out from the cluster CL-D or the cluster CL-C and data can be rewritten by merging the pieces of required sector data.

As the DFL entry, a replacement entry E7 (entry type "0") in FIG. 9E is generated, and the replacement source PCN(=CL-A) and a replacement destination PCN(=CL-E) are shown by the replacement entry E7. The replacement entry E4 is deleted.

Then, since the above-described rule (b) is satisfied, a first extension entry E8 and a second extension entry E9 are registered so as to be linked to the replacement entry E7. Accordingly, the extend flag in the replacement entry E7 is set to 1.

The content of the first extension entry E8 is the entry type "1", bitmap PCN=CL-E, sub type "0", and the sector bitmap of the state shown in FIG. 8E.

Since the above-described rule (b) is satisfied, the sector bitmap is set to "0" for the sector SC-z and SC-w and to "1" indicating "invalid" for the other sectors as shown in FIG. 8E.

The content of the second extension entry E8 is the entry type "1", bitmap PCN=CL-E, sub type "1", start flag=1, and previous LOW cluster number=CL-C.

Start flag=1 indicates the first extension entry linked to the replacement entry E7. This is because the previous extension entries E5 and E6 are deleted and the extension entries E8 and E9 are the first extension entries. In addition, previous LOW cluster number=CL-C indicates that the destination traced back to collect valid sector data is the cluster CL-C.

At a point in time after the DFL entry has reached the state of FIG. 9E, a valid sector in the cluster CL-E can be determined with reference to the first extension entry E8. In addition, with reference to the second extension entry E9, it is possible to determine that the data of a valid sector can be collected by tracing back to the cluster CL-C.

In addition, since the bitmap PCN is CL-E, the extension entries E8 and E9 are linked to the latest replacement entry E7. That is, searching from the replacement destination PCN of the latest replacement entry E7 is possible.

FIGS. 8F and 9F show states after the LOW according to the transition from the cluster CL-E to CL-F. It is assumed that a sector SC-v is an update target.

In this case, it is assumed that RMW reading has failed. As the DFL entry, a replacement entry E10 (entry type "0") in FIG. 9F is generated, and the replacement source PCN(=CL-A) and a replacement destination PCN CL-F) are shown by the replacement entry E10. The replacement entry E7 is deleted.

Then, since the above-described rule (c) is satisfied, a first extension entry E11 and a second extension entry E12 are registered so as to be linked to the replacement entry E10. Accordingly, the extend flag in the replacement entry E10 is set to 1. In addition, since this is the case of rule (c), the existing extension entries E8 and E9 are maintained without being deleted.

The content of the first extension entry E11 is the entry type "1", bitmap PCN=CL-F, sub type "0", and the sector bitmap of the state shown in FIG. 8F.

Since the above-described rule (c) is satisfied, the sector bitmap is set to "0" for the sector SC-v and to "1" indicating "invalid" for the other sectors as shown in FIG. 8F.

The content of the second extension entry E12 is the entry type "1", bitmap PCN=CL-F, sub type "1", start flag=0, and previous LOW cluster number=CL-E.

The start flag of the second extension entry E12 is set to 0 since the existing extension entries E8 and E9 are maintained.

In addition, previous LOW cluster number=CL-E indicates that the destination traced back to collect valid sector data is the cluster CL-E.

At a point in time after the DFL entry has reached the state of FIG. 9F, a valid sector in the cluster CL-F can be determined with reference to the first extension entry E11. In addition, tracing back to the extension entries E8 and E9 of the cluster CL-E can be determined with reference to the second extension entry E12, and a valid sector in the cluster CL-E can be determined with reference to the first extension entry E8 having a sector bitmap for the cluster CL-E. In addition, with reference to the second extension entry E9, it is possible to determine that the data of a valid sector can be collected by tracing back to the cluster CL-C.

In addition, since the bitmap PCN is CL-F, the extension entries E11 and E12 are linked to the latest replacement entry E10. That is, searching from the replacement destination PCN of the latest replacement entry E10 is possible. In addition, since the previous LOW cluster number of the extension entry E12 is CL-E, the linking state from the latest replacement entry E10 is maintained.

As described above, since the extension entries are registered under the predetermined conditions of rules (a), (b), and (c) in the DFL entry, it is possible to check the presence and position of valid sector data with reference to the DFL entry.

Incidentally, for the replacement entry, the first extension entry, and the second extension entry, bit assignment is set such that the arrangement order is suitable for processing when the replacement entry, the first extension entry, and the second extension entry are sorted.

For example, as each 8-bit DFL entry in FIG. 5, the replacement entry, the first extension entry, and the second extension entry are registered. However, on the disc drive apparatus side, the DFL entries are sorted and processed in ascending or descending order. For example, in the case of ascending order, the normal replacement entry is arranged, and then the first and second extension entries are arranged in order of PCN.

This is to assign the 8-bit DFL entry in order of the entry type, the PCN, and the sub type from the MSB side as shown in FIG. 6.

In this manner, even if an extension entry is added, processing on the disc drive apparatus side is not complicated.

<3. Configuration of a Disc Drive Apparatus>

Subsequently, a disc drive apparatus that performs recording/reproducing on the above optical disc will be described as an example of a recording apparatus of the present disclosure.

Figure 10:
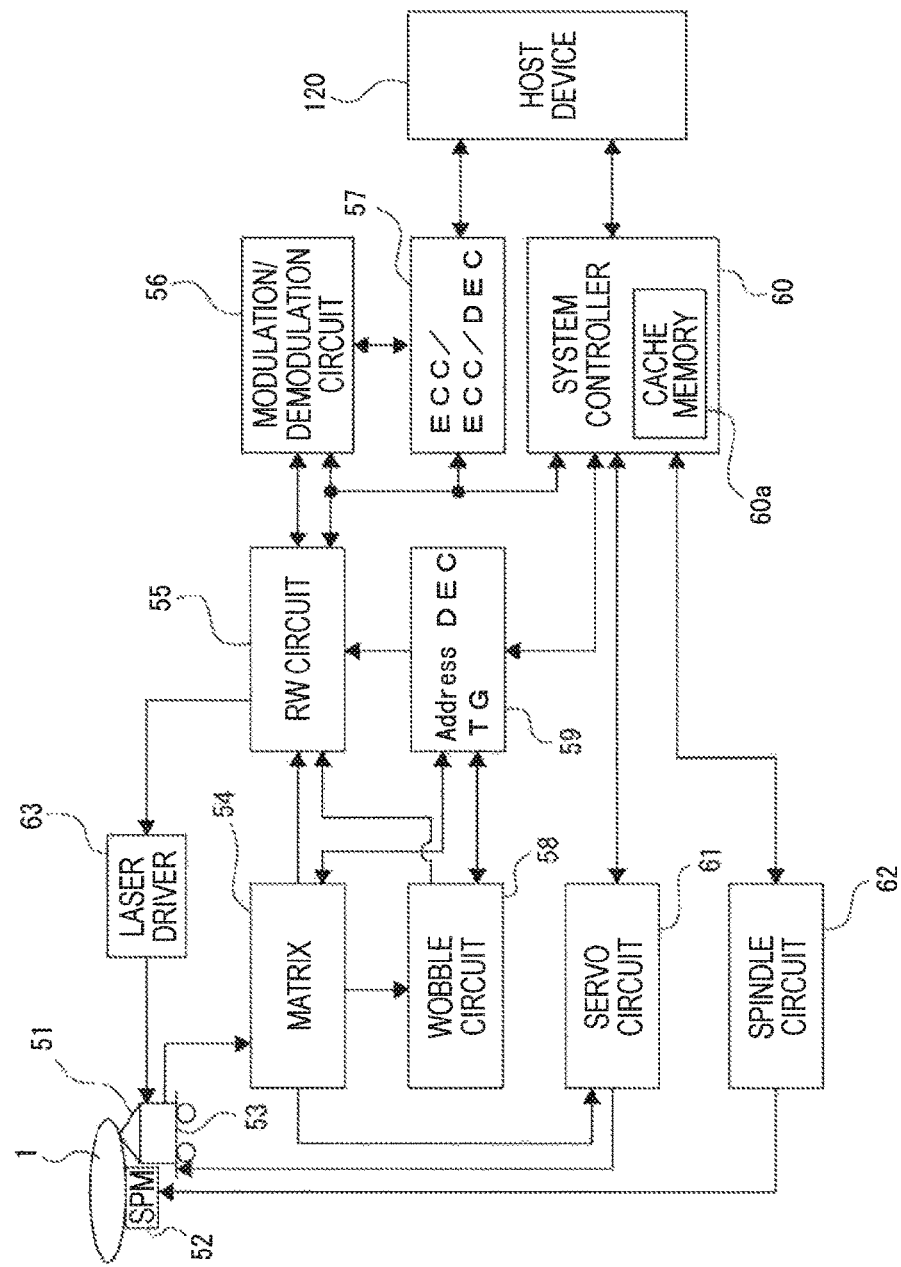
FIG. 10 is a block diagram of a disc drive apparatus of the embodiment.

FIG. 10 shows the configuration of the disc drive apparatus.

A disc 1 is the disc of the embodiment mentioned above. The disc 1 is loaded on a turn table (not illustrated), and is driven to rotate at a constant linear velocity (CLV) or a constant angular velocity (CAV) by a spindle motor 52 at the time of recording/reproducing operation.

In addition, an ADIP address embedded as the wobbling of groove tracks on the disc 1 and management/control information as pre-recorded information are read out by an optical pickup (optical head) 51.

In addition, at the time of initialization formatting or at the time of user data recording, management/control information or user data is recorded on the track in a recordable area by the optical pickup 51. At the time of reproduction, data recorded by the optical pickup 51 is read out.

In the optical pickup 51, a laser diode serving as a laser light source, a photodetector for detecting the reflected light, an objective lens serving as an output end of the laser light, and an optical system (not illustrated) for emitting the laser light to the disc recording surface through the objective lens and guiding the reflected light to the photodetector are formed.

In the optical pickup 51, the objective lens is held so as to be movable in the tracking direction and the focusing direction by a biaxial mechanism.

In addition, the entire optical pickup 51 is movable in the radial direction of the disc by a thread mechanism 53.

In addition, the laser diode in the optical pickup 51 is driven to emit laser by a drive signal (drive current) from a laser driver 63.

Reflected light information from the disc 1 is detected by the photodetector in the optical pickup 51, is converted into an electric signal corresponding to the amount of received light, and is supplied to a matrix circuit 54.

The matrix circuit 54 includes a current/voltage conversion circuit, a matrix calculation/amplification circuit, and the like corresponding to the output current from a plurality of light receiving elements as photodetectors, and generates a required signal by matrix calculation processing.

For example, a high-frequency signal (reproduction data signal) corresponding to reproduction data, a focus error signal for servo control, a tracking error signal, and the like are generated.

In addition, a signal relevant to the wobbling of the groove, that is, a push-pull signal as a signal for detecting wobbling, is generated.

In addition, the matrix circuit 54 may be integrally formed in the optical pickup 51.

The reproduction data signal output from the matrix circuit 54 is supplied to a reader/writer circuit 55, the focus error signal and the tracking error signal are supplied to a servo circuit 61, and a push-pull signal is supplied to a wobble circuit 58.

The reader/writer circuit 55 reproduces the data read out by the optical pickup 51 by performing binarization processing, reproduction clock generation processing using a PLL, and the like on the reproduction data signal, and supplies the reproduction data to a modulation/demodulation circuit 56.

The modulation/demodulation circuit 56 includes a functional part as a decoder at the time of reproduction and a functional part as an encoder at the time of recording.

At the time of reproduction, as decoding processing, run length limited code demodulation processing is performed on the basis of a reproduction clock.

In addition, an ECC encoder/decoder 57 performs ECC encoding processing for adding an error correction code at the time of recording and ECC decoding processing for performing error correction at the time of reproduction.

At the time of reproduction, the data demodulated by the modulation/demodulation circuit 56 is transmitted to the internal memory, and error detection/correction processing and processing, such as deinterleaving, are performed to obtain reproduction data.

The data decoded into the reproduction data by the ECC encoder/decoder 57 is read out and transmitted to a connected host device 120 on the basis of an instruction of a system controller 60. The host device 120 is, for example, a computer device or an audio-visual (AV) system device.

The push-pull signal output from the matrix circuit 54 as a signal relevant to the wobbling of a groove is processed by the wobble circuit 58. The push-pull signal as the ADIP information is demodulated into a data stream forming the ADIP address by the wobble circuit 58, and supplied to an address decoder 59.

The address decoder 59 acquires an address value by decoding the supplied data, and supplies the address value to the system controller 60.

In addition, the address decoder 59 generates a clock by PLL processing using the wobble signal supplied from the wobble circuit 58, and supplies the clock to each unit as an encoding clock at the time of recording.

In addition, as a push-pull signal output from the matrix circuit 54 as a signal relevant to the wobbling of a groove, a push-pull signal as pre-recorded information (PIC) is supplied to the reader/writer circuit 55 after being subjected to band pass filter processing in the wobble circuit 58. Then, after the push-pull signal is binarized to become a data bit stream, the data bit stream is ECC-decoded and deinterleaved by the SCC encoder/decoder 57. As a result, data as pre-recorded information is extracted. The extracted pre-recorded information is supplied to the system controller 60.

The system controller 60 can perform various kinds of operation setting processing, copy protection processing, and the like on the basis of the read pre-recorded information.

At the time of recording, recording data (new recording data or update data of recorded data) is transmitted from the host device 120, and the recording data is transmitted to the memory in the ECC encoder/decoder 57 and is buffered.

In this case, the ECC encoder/decoder 57 adds an error correction code, an interleave, a sub code, or the like as encoding processing on the buffered recording data.

In addition, the ECC-encoded data is modulated using, for example, an RLL (1-7) PP method (RLL; run length limited, PP: Parity preserve/Prohibit rmtr (repeated minimum transition run length)) in the modulation/demodulation circuit 56, and the modulated data is supplied to the reader/writer circuit 55.

As an encoding clock serving as a reference clock for the encoding processing at the time of recording, a clock generated from the wobble signal as described above is used.

For the recording data generated by encoding processing, fine adjustment of the optimum recording power, adjustment of the laser drive pulse waveform, and the like with respect to the characteristics of the recording layer, the spot shape of laser light, recording linear velocity, and the like are performed as recording compensation processing in the reader/writer circuit 55. Then, the obtained data is transmitted to the laser driver 63 as a laser drive pulse.

The laser driver 63 supplies the supplied laser drive pulse to the laser diode in the optical pickup 51 to perform laser emission driving. As a result, pits corresponding to the recording data are formed on the disc 1.

In addition, the laser driver 63 includes a so-called auto power control (APC) circuit, and control is made such that the output of the laser is constant regardless of the temperature or the like while monitoring the laser output power using the output of a detector for monitoring the laser power provided in the optical pickup 51. The target value of the laser output at the time of recording and at the time of reproduction is given from the system controller 60, and each laser output level is controlled so as to become the target value at the time of recording and at the time of reproduction.

The servo circuit 61 generates various servo drive signals of focus, tracking, and thread from the focus error signal and the tracking error signal from the matrix circuit 54 to execute the servo operation.

That is, a focus drive signal and a tracking drive signal are generated according to the focus error signal and the tracking error signal to drive the focus coil and the tracking coil of the biaxial mechanism in the optical pickup 51. As a result, a tracking servo loop and a focus servo loop by the optical pickup 51, the matrix circuit 54, the servo circuit 61, and the biaxial mechanisms are formed.

In addition, in response to a track jump command from the system controller 60, the servo circuit 61 turns off the tracking servo loop and outputs a jump drive signal to execute the track jump operation.

In addition, the servo circuit 61 generates a thread drive signal on the basis of a thread error signal obtained as a low-frequency component of the tracking error signal, access execution control from the system controller 60, and the like, and drives the thread mechanism 53. Although not illustrated, the thread mechanism 53 has a mechanism including a main shaft for holding the optical pickup 51, a thread motor, a transmission gear, and the like, and required sliding movement of the optical pickup 51 is performed by driving the thread motor according to the thread drive signal.

A spindle servo circuit 62 performs control to rotate the spindle motor 52 at the CLV or CAV.

The spindle servo circuit 62 obtains the clock generated by the PLL processing on the wobble signal as the current rotation speed information of the spindle motor 52 and compares the obtained rotation speed information with reference speed information of the predetermined CLV or CAV to generate a spindle error signal.

In addition, at the time of data reproduction, since a reproduction clock (clock serving as a reference of decoding processing) generated by the PLL in the reader/writer circuit 55 is the current rotation speed information of the spindle motor 52, it is also possible to generate a spindle error signal by comparing the reproduction clock with predetermined CLV reference speed information.

In addition, the spindle servo circuit 62 outputs a spindle drive signal generated according to the spindle error signal to rotate the spindle motor 52.

In addition, the spindle servo circuit 62 also generates a spindle drive signal according to the spindle kick/brake control signal from the system controller 60 to execute operations, such as start, stop, acceleration, and deceleration of the spindle motor 52.

Various operations of the servo system and the recording/reproducing system described above are controlled by the system controller 60 that is a microcomputer.

The system controller 60 executes various kinds of processing according to a command from the host device 120.

For example, when a write command is issued from the host device 120, the system controller 60 moves the optical pickup 51 to the writing target address first. In addition, the ECC encoder/decoder 57 and the modulation/demodulation circuit 56 execute the encoding processing on the data transmitted from host device 120 as described above. Then, the laser drive pulse from the reader/writer circuit 55 is supplied to the laser driver 63 as described above, so that recording is executed.

In addition, for example, in a case where a read command requesting the transmission of certain data recorded on the disc 1 is supplied from the host device 120, access operation control is performed first for the designated address. That is, a command is issued to the servo circuit 61 so that the access operation of the optical pickup 51 targeting the address designated by the read command is executed.

Thereafter, operation control required to transmit the data of the designated data section to the host device 120 is performed. That is, data is read out from the disc 1, and the reader/writer circuit 55, the modulation/demodulation circuit 56, and the ECC encoder/decoder 57 execute decoding/buffering and the like to transmit the requested data.

In addition, when a write command is issued from the host device 120, data is read out as the above-described RMW. Also in this case, the system controller 60 performs similar read control for a cluster including a rewriting target sector.

In addition, at the time of recording/reproducing of the data, the system controller 60 can control access or recording/reproducing operation using the ADIP address detected by the wobble circuit 58 and the address decoder 59.

In addition, at a predetermined point in time, such as when the disc 1 is loaded, the system controller 60 reads the unique ID recorded in the BCA of the disc 1 or the pre-recorded information (PIC) recorded as a wobbling groove in the reproduction only area.

In this case, seek operation control is performed first for the BCA and the PIC. That is, a command is issued to the servo circuit 61 to execute the access operation of the optical pickup 51 to the innermost peripheral side of the disc.

Thereafter, the optical pickup 51 executes reproduction tracing to obtain a push-pull signal as reflected light information, and the wobble circuit 58, the reader/writer circuit 55, and the ECC encoder/decoder 57 execute decoding processing. As a result, reproduction data as BCA information or pre-recorded information is obtained.

The system controller 60 performs laser power setting, copy protection processing, and the like on the basis of the BCA information or the pre-recorded information read out in this manner.

In the diagram, a cache memory 60a is shown within the system controller 60. The cache memory 60a is used for the information read out from the TDMA of the disc 1 or updating thereof, for example.

For example, when the disc 1 is loaded, the system controller 60 controls each unit to read out various kinds of management information recorded in the TDMA, and stores the read management information in the cache memory 60a. The information of the DFL entry described, above is also included.

Thereafter, when replacement processing due to data rewriting or a defect is performed, the management information in the cache memory 60a is updated.

For example, when the replacement processing is performed by the LOW to update the management information including the DFL entry, the management information may be additionally recorded in the TDMA of the disc 1 each time. However, such recording will speed up the consumption of the TDMA of the disc 1.

Therefore, for example, while the disc 1 is ejected from the disc drive apparatus, the management information is updated in the cache memory 60a. Then, at the time of ejection or the like, the final (latest) management information in the cache memory 60a is written in the TDMA of the disc 1. As a result, since a number of updates of management information are collectively updated on the disc 1, it is possible to reduce the consumption of the TDMA of the disc 1.

Incidentally, the configuration example of the disk drive apparatus shown in FIG. 10 is an example of a disk drive apparatus connected to the host device 120, but there may be a disk drive apparatus that is not connected to other devices. In this case, an operation unit or a display unit is provided, or the configuration of an interface unit for data input/output is different from that shown in FIG. 10. That is, it is preferable that recording or reproducing is performed according to the operation of the user and a terminal unit for inputting/outputting various kinds of data is formed.

Needless to say, as configuration examples, other configurations can be variously considered. For example, examples as recording only apparatuses and reproduction only apparatuses can also be considered.

<4. Data Rewriting Processing>

An example of control processing of the system controller 60 at the time of data rewriting (LOW) in the above disc drive apparatus will be described.

Figure 11:
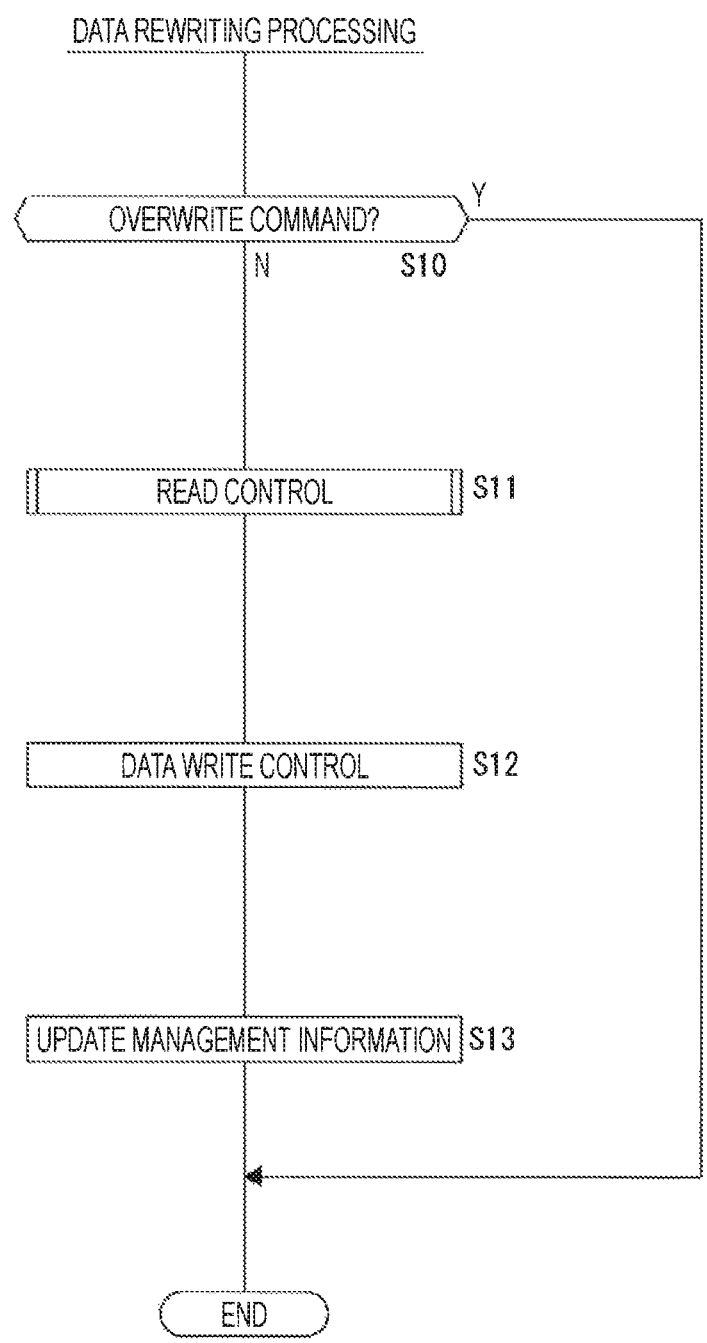
FIG. 11 is a flowchart of rewriting processing of the embodiment.

FIG. 11 shows processing of the system controller 60 at the time of data rewriting as LOW.

When a write command targeting a certain sector from the host device 120 and sector data as update data are received, the system controller 60 proceeds from step S10 to step S11 in the processing of FIG. 11 to perform read control. This is the control of data reading as RMW. Specifically, the system controller 60 controls each unit so as to read out data of a cluster including a rewriting target sector. Then, update data of the rewriting target sector and recorded data of other sectors are merged to generate write data in cluster units.

Then, in step S12, the system controller 60 controls writing of the write data generated in cluster units in step S11 to the disc 1. The system controller 60 controls each unit as described above to execute data writing. In this case, the designated writing position is a PCN in the non-recording state on the disc 1. The PCN serves as the replacement destination PCN.

In step S13, the system controller 60 updates the management information according to current data rewriting. Specifically, the system controller 60 updates the information of the next writable position, or updates the above DFL entry. In addition, although the updating of the management information herein may be performed on the information of the TDMA read into the cache memory 60a, the management information may be written to the disc 1. Alternatively, the management information may be updated within the cache memory 60a while the disc 1 is loaded, and may be written to the disc 1 at a predetermined timing such as disk ejection or power off.

In such data rewriting processing, in the present embodiment, efficient processing using the above DFL entry is realized particularly at the time of read control in step S11.

Figure 12:
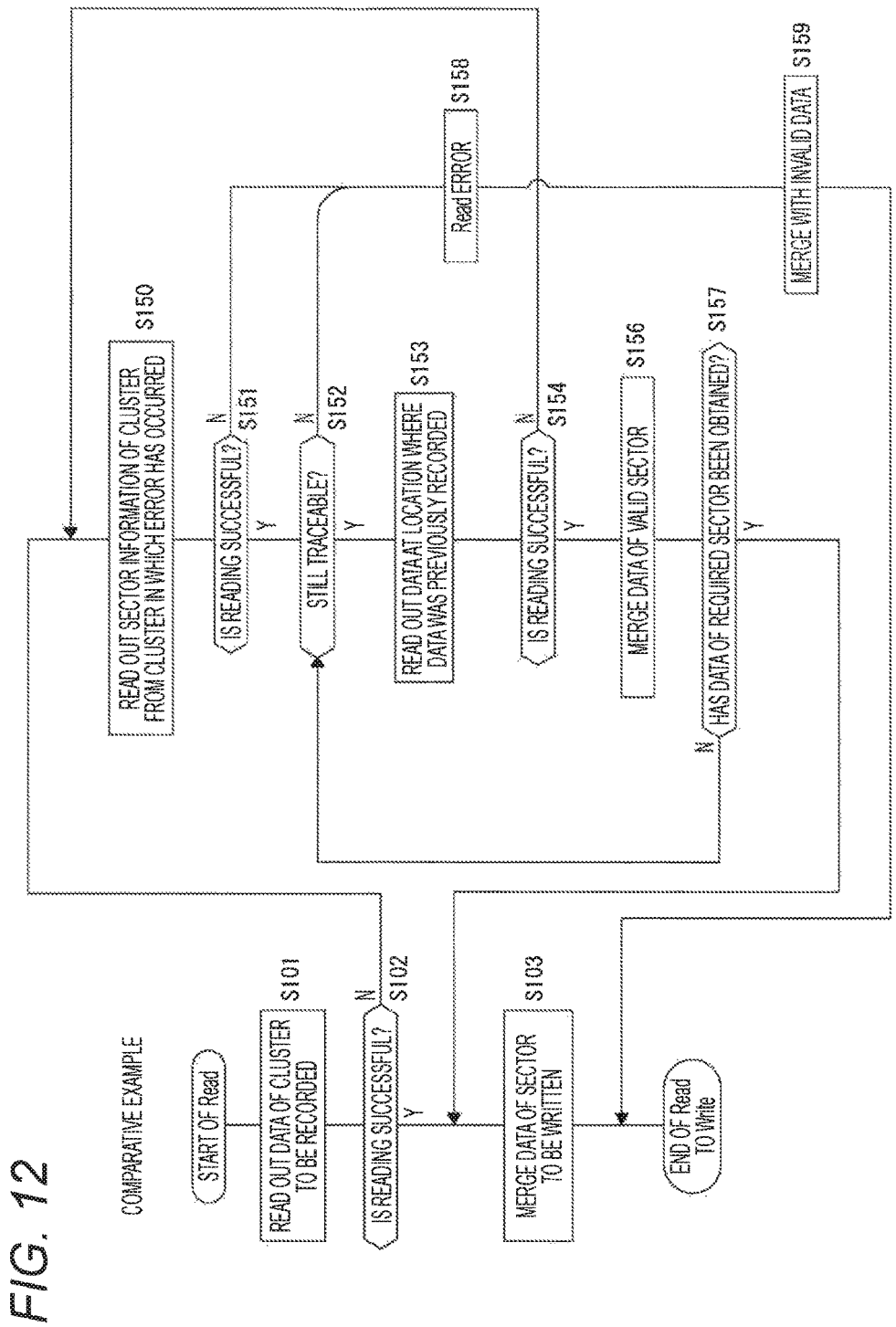
FIG. 12 is a flowchart of RMW processing of a comparative example.

Here, for understanding of the processing of the embodiment, a comparative example will be described with reference to FIG. 12. FIG. 12 shows an example of processing in a case where no extension entry is used in the read control of step S11 in FIG. 11.

As read processing for the RMW, first, the system controller 60 controls the reading of data of a cluster including a rewriting target sector in step S101. That is, the cluster is a cluster including a sector for which rewriting has been instructed from the host device 120.

In a case where the data of the cluster can be appropriately read out in a reading operation according to the read control, the system controller 60 proceeds from step S102 to step S103. In step S103, update data of the rewriting target sector and sector data of the read cluster are merged to generate write data in cluster units, and the process proceeds to data write control (step S12 in FIG. 11). The above is a case where reading can be normally completed.

On the other hand, in a case where the data reading of the cluster is not successful for some reasons, the system controller 60 proceeds from step S102 to step S150.

First, in step S150, sector information included in the cluster in which the read error has occurred is read out. In the case of a BD type disc, a sector status and a previous location address (PLA) are recorded in the cluster as additional information. The sector status is information indicating validity/invalidity or the like for each sector in the cluster. The PLA is the address of a cluster that is the replacement destination in previous rewriting.

In the case of a cluster in which read failure has occurred, there are a case where sector information can be read out and a case where sector information cannot be read out. In a case where sector information cannot be read out, the system controller 60 proceeds from step S151 to step S158 to determine that a read error has occurred. Then, since valid sector data other than the current rewriting target sector cannot be collected, merging using invalid data is performed in step S159 to generate write data in cluster units. That is, write data is generated in cluster units by setting invalid data (for example, "0" data) for all sectors other than sectors in which the current update data is arranged, and the process proceeds to data write control (step S12 in FIG. 11).

In a case where sector information can be read out, the system controller 60 proceeds from step S151 to step S152 to determine whether or not tracing back to other clusters is possible. That is, it is determined whether or not other clusters are shown as the PLA. If tracing back to other clusters is not possible, it is determined that a read error has occurred in step S158, and merging using dummy data is performed in step S159.

In a case where tracing back to other clusters is possible, the system controller 60 proceeds to step S153 to control the reading of data of the cluster indicated by the PLA, that is, a location where data was previously recorded.

Then, in a case where the reading of other clusters is successful, the system controller 60 proceeds from step S154 to step S156 to merge the data of valid sectors of the read cluster.

However, data of all the required valid sectors is not necessarily obtained by one-time backward cluster reading.

The required valid sectors referred to herein mean, for example, all sectors other than sectors to be currently updated.

Therefore, in step S157, it is determined whether or not the data of required sectors has been collected. That is, it is determined whether or not the data of all sectors other than sector data to be currently updated can be read out and merged.

In a case where valid sector data is obtained as all sectors other than the current update target sector, the system controller 60 proceeds from step S157 to step S103 to merge the read valid sector data with the update data. As a result, since write data in cluster units including no dummy data can be formed, the process proceeds to data write control (step S12 in FIG. 11).

That is, even when the reading of a cluster having a recording target sector fails, it is possible to collect sector data by tracing back to clusters recorded in the past. Accordingly, this is a case where no read error occurs.

On the other hand, in a case where it is determined that required sector data has not yet been obtained in step S157, the system controller 60 returns to step S152 to check whether or not further tracing is possible (PLA is shown) with reference to the sector information of the cluster read by tracing.

Then, if the tracing is possible, steps S153 to S156 are performed. Alternatively, in a case where the tracing is not possible, it is determined that a read error has occurred in step S158.

In addition, there is a case where a traced cluster cannot be readout. At that time, the system controller 60 returns from step S154 to S150 to read out the sector information of the cluster in which read failure has occurred. Then, the above-described processing is performed depending on whether or not sector information can be read out.

By performing the processing as described above, even if the reading of a cluster including a rewriting target sector fails at the beginning, a case occurs where valid sector data is searched back to previously replaced clusters and accordingly, since it is not determined that a read error has occurred, write data in cluster units based only on the valid sector data can be generated.

However, this is disadvantageous in the following points.

First, if it is not possible to read our the sector information of the cluster in which read failure has occurred in step S150, tracing is not possible either, and it is not possible to determine which sector is a valid sector. In a cluster in which read failure has occurred in the first place, it is not possible to read out sector information in many cases. Therefore, a possibility that valid sector data can be searched for and restored is relatively low.

In addition, since clusters indicated by the PLA are read out one by one for tracing, access time to the location of required information increases. Therefore, the time for generating write data in units of clusters in which valid sector data has been restored is required. In addition, since it is finally determined that a read error has occurred in a case where no cluster can be read out by tracing back to the end, a time is also required in a case where it is determined that a read error has occurred. In addition, due to such circumstances, a long time is required for the processing of step S11 in FIG. 11. Eventually, the response to the host device 120 for the write command is lowered.

In order to solve these inconveniences, in the case of the present embodiment, the above-described extension entry is recorded on the disc 1, and the disc drive apparatus performs efficient sector data restoration or read error determination using the extension entry even if reading at the time of LOW fails.

Figure 13:
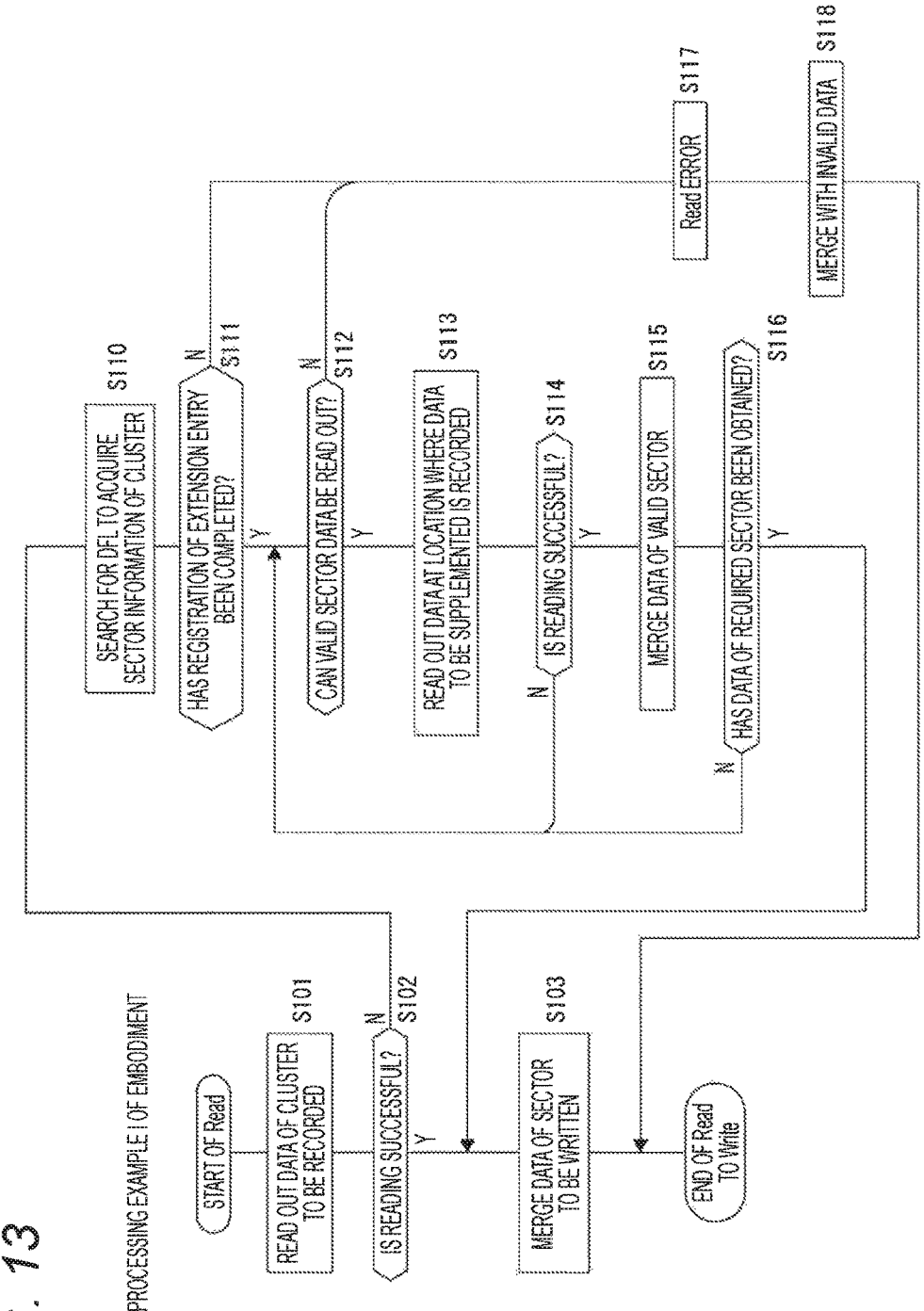
FIG. 13 is a flowchart of processing example I of RMW of the embodiment.

FIG. 13 shows the read control (processing example I) of step S11 in FIG. 11 by the disc drive apparatus of the embodiment.

As read processing for the RMW, first, the system controller 60 controls the reading of the data of the cluster recorded in step S101. That is, the cluster is a cluster including a sector for which rewriting has been instructed from the host device 120. In addition, in a case where LOW has already been performed once or more for clusters having a sector specified by the host device 120 so that a replacement entry is registered, the replacement destination cluster of the replacement entry is a read target.

In a case where the data of the cluster can be appropriately read out in a reading operation according to the read control, the system controller 60 proceeds from step S102 to step S103. In step S103, update data of the rewriting target sector and sector data of the read cluster are merged to generate write data in cluster units, and the process proceeds to data write control (step S12 in FIG. 11). The above is a case where reading can be normally completed, and the content up to now is similar to that in the comparative example in FIG. 12.

In a case where the data reading of the cluster is not successful for some reasons, the system controller 60 proceeds from step S102 to step S110.

In step S110, the system controller 60 acquires the sector information of the cluster, in which a read error has occurred, from the DFL entry. That is, among the DFL entries, replacement entries in which a cluster, in which data reading has currently failed, is registered as a replacement destination cluster are searched.

Then, in step S111, the system controller 60 checks whether or not the extension entry linked to the replacement entry, in which the cluster is the replacement destination cluster, has already been registered.

In a case where the target cluster, in which read failure has occurred in the first place, was not recorded by the LOW performed in the past, there is no replacement entry in which the cluster is the replacement destination cluster. In addition, even if the replacement entry can be searched for, if the extend flag of the replacement entry is 0, the extension entry is not present. In these cases, since valid sector data cannot be restored, the system controller 60 proceeds from step S111 to step S117 to determine that a read error has occurred. Then, since valid sector data other than the current rewriting target sector cannot be collected, merging using invalid data is performed in step S118 to generate write data in cluster units. That is, write data is generated in cluster units by setting invalid data (for example, "0" data) for all sectors other than sectors in which the current update data is arranged, and the process proceeds to data write control (step S12 in FIG. 11).

In a case where there is an extension entry for the cluster in which read failure has occurred, the system controller 60 proceeds from step S111 to step S112 to check whether or not valid sector data can be still read out. That is, the sector bitmap of the first extension entry or the previous LOW cluster number and the bitmap start flag of the second extension entry are checked, and it is checked whether or not backward reading is still possible for sector data restoration.

In a case where there is a possibility that valid sector data can be read out, that is, in a case where there is no tracing, the process proceeds to step S113. In step S113, a location (address: PCN and sector number) where sector data to be supplemented is recorded is specified on the basis of the information of the extension entry, and data read control for the address is performed.

Then, in a case where required sector data can be read out, the system controller 60 proceeds from step S114 to step S115 to merge the data of valid sectors of the read cluster. Also in this case, data of all the required valid sectors is not necessarily obtained by one-time supplementary data reading. Also in this case, the required sectors mean, for example, all sectors other than sectors to be updated by the current write command.

Therefore, in step S116, it is determined whether or not the data of required sectors has been collected. That is, it is determined whether or not the data of each sector other than sectors to be currently updated can be read out and merged.

In a case where valid sector data is obtained as all sectors other than the current update target sector, the system controller 60 proceeds from step S116 to step S103 to merge the read valid sector data with the update data. As a result, since write data in cluster units based on sector data including no dummy data can be formed, the process proceeds to data write control (step S12 in FIG. 11).

That is, even when the reading of a cluster having a recording target sector fails, it is possible so collect sector data by tracing back to clusters recorded in the past with reference to the DFL entry. Accordingly, this is a case where no read error occurs.

The system controller 60 returns to step S112 in a case where it is determined that reading has failed in step S114. In addition, also in a case where it is determined that the data of required sectors has not yet been obtained in step S116, the process returns to step S112.

In these cases, if tracing is still possible, control to readout the data at the location where data to be supplemented is recorded is performed in step S113 on the basis of the information of the DFL entry.

On the other hand, in a case where tracing is not possible in step S112, that is, information for further tracing is not present in the DFL entry, in a state in which data of required sectors has not yet been obtained, it is determined that a read error has occurred in step S117, merging using invalid data is performed in step S118, and the process proceeds to data write control (step S12 in FIG. 11).

A specific example of the above processing, particularly the processing of step S113 will be described with reference to FIG. 9.

For example, it is assumed that the DFL entry is currently in the state of FIG. 9D. It is assumed that a write command giving an instruction for rewriting of a certain sector in the cluster CL-A and update data are supplied from the host device 120.

In this case, in the RMW operation, according to the write command, the cluster CL-D indicated by the replacement destination PCN of the replacement entry E4 at the current point in time is to be read out first. However, assuming that the reading fails to proceed to step S112, the replacement entry E4 and the extension entries E5 and E6 are searched for the cluster CL-D.

Since the valid sector of the cluster CL-D can be checked from the sector bitmap of the first extension entry E5, reading of the valid sector can be tried in step S113.

In addition, even if required sector data is not obtained in this step, it is possible to check the cluster CL-C from the previous LOW cluster number of the second extension entry E6 and access the cluster CL-C to collect the required sector data. With this processing, a case occurs where the required sector data for merging can be collected.

In addition, it is assumed that the DFL entry is in the state of FIG. 9F. Similarly to the above, it is assumed that a write command giving an instruction for rewriting of a certain sector in the cluster CL-A and update data are supplied from the host device 120.

In this case, in the RMW operation, according to the write command, the cluster CL-F indicated by the replacement destination PCN of the replacement entry E10 at the current point in time is to be read out first. However, assuming that the reading fails to proceed to step S112, the replacement entry E10 and the extension entries E8, E9, E11, and E12 are searched for the cluster CL-F.

Since the valid sector of the cluster CL-F can be checked from the sector bitmap of the first extension entry E11, reading of the valid sector can be tried in step S113.

In addition, even if required sector data is not obtained in this step, it is possible to check the cluster CL-E from the previous LOW cluster number of the second extension entry E12 and check the valid sector in the cluster CL-E from the first extension entry E8 of the cluster CL-E. Therefore, in step S113, reading of the valid sector can be tried.

In addition, even if required sector data is not obtained in this step, it is possible to check the cluster CL-C from the previous LOW cluster number of the second extension entry E9 and access the cluster CL-C to collect the required sector data. With this processing, a case occurs where sector data can be restored.

In addition, since the bitmap start flag is 1 in the second extension entry E9, extension entries cannot be traced back any more. If sector data is not prepared in this state, a read error occurs.

In such a processing example I of the embodiment, even if the reading of a cluster including a rewriting target sector fails at the beginning, a case occurs where valid sector data is searched back to previously replaced clusters with reference to the DFL entry and accordingly, since it is not determined that a read error has occurred, write data in cluster units based only on the valid sector data can be generated.

This is advantageous as follows over the comparative example.

First, since sector information is recorded as a DFL entry at a location (management area) different from the cluster in which reading failure has occurred, a possibility that the sector information (particularly the sector bitmap and the previous LOW cluster number) will be read out is very high compared with the case of the comparative example. If there is no sector information, it is not possible to restore valid sector data by tracing. Accordingly, the restoration strength is greatly improved.

In addition, the recording position (address) of sector data to be supplemented for the merge processing for generating write data in cluster units can be determined directly from the DFL entry. This means that the access efficiency is greatly improved compared with the comparative example in which clusters are read out one by one to check whether or not a valid sector is present. Therefore, the time required for sector data restoration can be considerably shortened.

In particular, since DFL entries can be checked within the cache memory 60a, disk access is not necessary for checking the sector bitmap or the previous LOW cluster number. This also leads to more efficient processing and improved access efficiency.

In addition, by checking whether or not tracing is possible with the DFL entry, read error determination can be made at the time when it is determined that the tracing is not possible. Therefore, it is possible to shorten the time even in a case where a read error occurs.

From these facts, the processing time of step S11 in FIG. 11 is shortened, and the response to the host device 120 is also improved.

Figure 14:
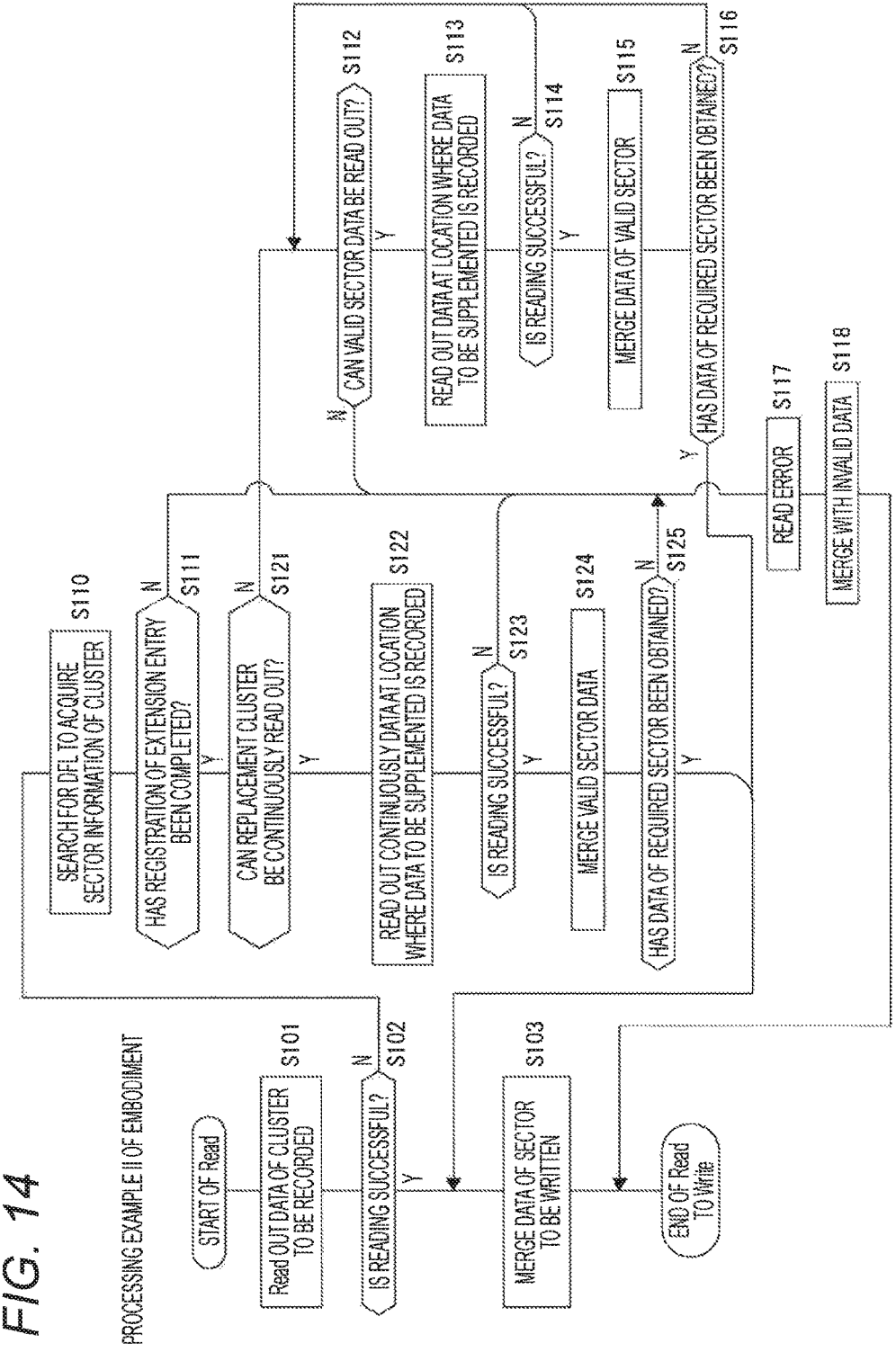
FIG. 14 is a flowchart of processing example II of RMW of the embodiment.

Next, FIG. 14 shows the read control (processing example II) of step S11 in FIG. 11. In addition, the same processes as in FIG. 13 are denoted by the same step numbers, and the detailed description thereof will be omitted.

In the processing example II of FIG. 14, in a case where the system controller 60 fails to read a cluster including a sector for which a rewriting instruction has been given from the host device 120 in step S102, the system controller 60 proceeds to steps S110 and S111 as in FIG. 13. In particular, in a case where there is an extension entry, it is determined from the information of the DFL entry whether or not replacement clusters can be read out consecutively in step S121.

Here, the fact that replacement clusters can be read out consecutively means that clusters in which data has been written in a plurality of past LOWs, that is, all clusters traced back to collect sector data, are physically continuous on the disc 1.

For example, in the case of FIG. 9F, whether or not the clusters CL-F, CL-E, and CL-C are physically continuous clusters are determined by the PCN.

In the actual use mode, a replacement cluster to which data is written at the time of LOW is designated by, for example, a next writable address (NWA) recorded in the TDMA as management information. The NWA is information indicating the PCN where writing can be performed next. In addition, each time the data rewriting operation is performed, the NWA is updated so that the next PCN where writing has been performed is designated. Therefore, in a case where sector data of a certain cluster is repeatedly updated, a possibility that replacement clusters will be physically continuous is high.

In a case where such a situation occurs, in the reading of a plurality of clusters in the past, it is efficient to continuously read out the plurality of clusters.

Therefore, in a case where replacement clusters can be read out consecutively, the system controller 60 proceeds from step S121 to S122 to perform control to read out the plurality of clusters consecutively.

Then, in a case where the reading is successful, the system controller 60 proceeds from step S123 to step S124 to merge the data of valid sectors of the read clusters. Then, in step S125, it is determined whether or not data of required sectors other than the sector data to be currently updated has been obtained. If it is determined that the data of required sectors other than the sector data to be currently updated has been obtained, the process proceeds to step S103.

On the other hand, in a case where it is determined that the reading has failed in step S123 or in a case where it is determined that the required sectors have not been obtained in step S125, it is determined that a read error has occurred in step S117, merging using invalid data is performed in step S118, and the process proceeds to data write control (step S12 in FIG. 11).

In a case where it is determined that replacement clusters cannot be read out consecutively in step S121, the system controller 60 performs the processing of steps S112, S113, S114, S115, and S116. This is similar to the processing of FIG. 13.

As described above, in the processing example II of FIG. 14, if a plurality of clusters to be traced back are physically continuous and can be read out, the clusters are consecutively read out. As a result, since the efficiency of cluster access can be improved, an opportunity to quickly complete the read processing of FIG. 11 can be obtained.

In addition, in the example of FIG. 14, in a case where all of the plurality of clusters that can be traced back are physically continuous, the processing of step S122 is performed. However, this may be applied to some of the consecutive clusters. That is, in a case where some of a plurality of clusters that can be recognized as being traceable by DFL entries are physically continuous, it is naturally possible to continuously read out the consecutive clusters once. This also improves the read efficiency.

Figure 15:
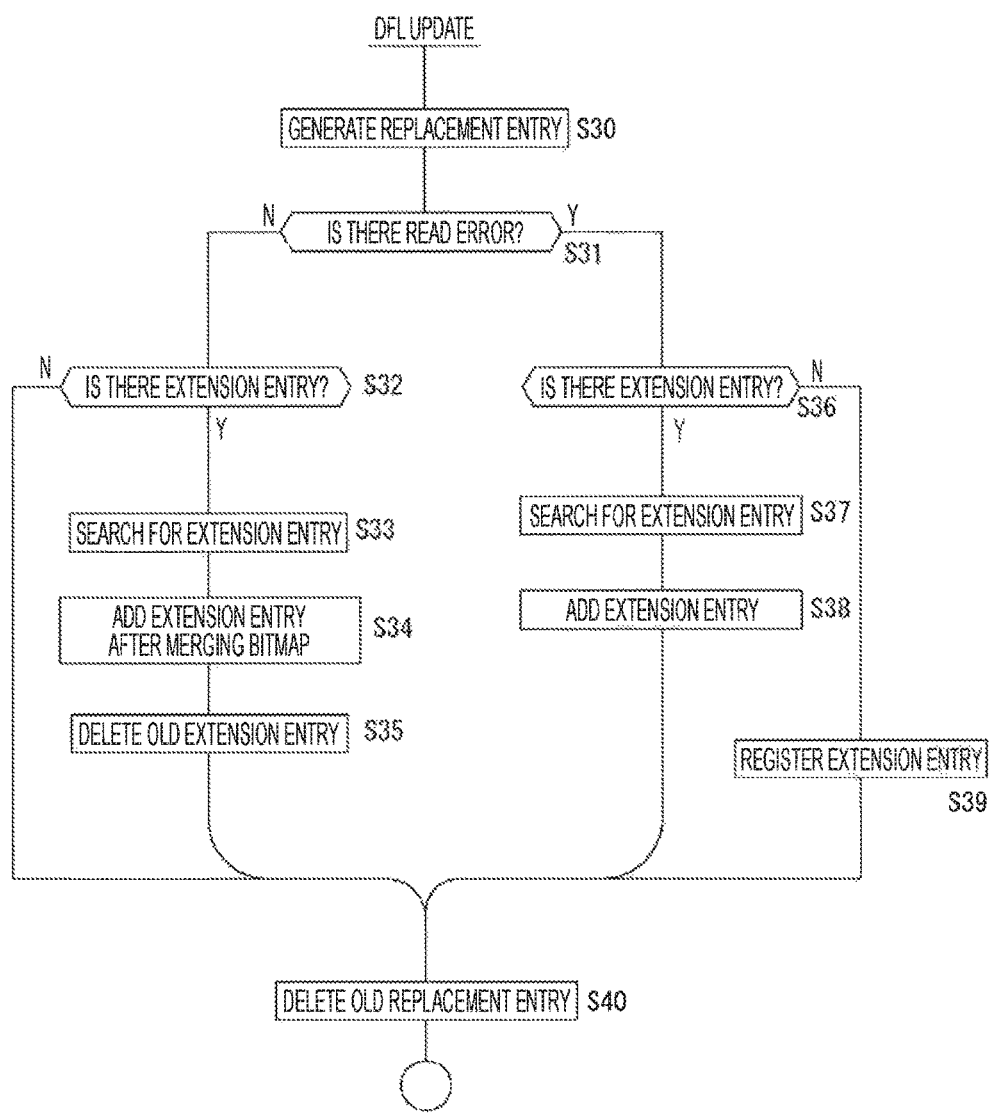
FIG. 15 is a flowchart of DFL update processing of the embodiment.

Next, in the management information update of step S13 in FIG. 11, DFL entry update processing will be described with reference to FIG. 15.

Due to performing the LOW, the system controller 60 needs to update the DFL entry. That is, as described with reference to FIGS. 8 and 9, processing for generating/updating replacement entries or generating extension entries according to the writing status is performed.

The system controller 60 updates a replacement entry (DFL entry of the entry type "0") in step S30. That is, as described with reference to FIG. 9, a replacement entry that makes the replacement destination PCN indicating a new replacement destination cluster correspond to the cluster (replacement source PCN) of the replacement source is generated.

In addition, for the extend flag, if the existing replacement entry (hereinafter, an "old replacement entry") is "1" at this point in time, a replacement entry generated for updating is also set to "1". Even if the old replacement entry is "0", in a case where a read error has currently occurred and the above-described rule (a) of extension entry addition is satisfied, the extend flag in the replacement entry to be generate is set to 1 in order to generate an extension entry.

If the extend flag of the old replacement entry is 0 and no read error has currently occurred, the extend flag is also set to 0 in the replacement entry generated for updating.

In step S31, the process is branched depending on whether or not a read error has occurred in the current RMW. In a case where no read error has occurred, the process is branched depending on whether or not there is a corresponding extension entry in step S32.

In addition, the presence or absence of the extension entry in this case is determined with reference to the extend flag of the old replacement entry instead of the replacement entry generated in step S30.

In a case where no read error has occurred and there is no extension entry, none of the above-described rules (a), (b) and (c) (a) of extension entry addition are satisfied. Accordingly, no extension entry is generated. Then, in step S40, the system controller 60 deletes the old replacement entry, and ends the DFL update processing.

This is the DFL update processing in the case described with reference to FIGS. 9A, 9B, and 9C.

A case where no read error has occurred but there is an extension entry corresponds to the rule (b). Therefore, the system controller 60 searches for the corresponding extension entry in step S33, and adds the first and second extension entries after merging the sector bitmap in step S34. In step S35, the existing extension entry is deleted. Then, in step S40, the system controller 60 deletes the old replacement entry, and ends the DFL update processing.

This is the DFL update processing in the case described with reference to FIG. 9E.

In a case where a read error occurs, that is, in a case where the processing of steps S158 and S159 in FIG. 13 or 14 is performed, the system controller 60 branches the processing depending on whether or not the corresponding extension entry is present in step S36.

A case where there is no extension entry corresponds to the rule (a). Therefore, the system controller 60 generates and registers an extension entry in step S39.

Specifically, the system controller 60 sets the entry type to "1", sets the sub type "0", and sets the replacement destination PCN to the bitmap PCN, thereby generating a first extension entry having a sector bitmap corresponding to the bitmap PCN.

In addition, the system controller 60 sets the entry type to "1", sets the sub type "1", sets the replacement destination PCN to the bitmap PCN, and sets the bitmap start flag to 1, thereby generating a second extension entry in which the replacement destination PCN of the previous LOW is the previous LOW cluster number. Then, in step S40, the old replacement entry is deleted.

This is the DFL update processing in the case described with reference to FIG. 9D.

A case where a read error has occurred and there is an extension entry corresponds to the rule (c). Therefore, the system controller 60 searches for the corresponding extension entry in step S37, and adds the first and second extension entries in step S38.

Specifically, the system controller 60 sets the entry type to "1", sets the sub type "0", and sets the replacement destination PCN to the bitmap PCN, thereby generating a first extension entry having a sector bitmap corresponding to the bitmap PCN.

In addition, the system controller 60 sets the entry type to "1", sets the sub type "1", sets the replacement destination PCN to the bitmap PCN, and sets the bitmap start flag to 0, thereby generating a second extension entry in which the bitmap PCN of the latest extension entry among the searched existing extension entries is the previous LOW cluster number. In addition, in this case, the existing extension entries are not deleted.

Then, in step S40, the system controller 60 deletes the old replacement entry, and ends the DFL update processing.

This is the DFL update processing in the case described with reference to FIG. 9F.

By updating the DFL entry as described above, it is possible to restore the sector data using the DFL entry as shown in FIGS. 13 and 14.

<5. Summary and Modifications>

In the present embodiment described above, the following effects can be obtained.

The disc drive apparatus of the embodiment includes a write/read unit capable of performing data writing in a cluster (second data unit), in which a plurality of sectors (first data unit of a predetermined amount of data) are consecutive, and data reading in sector units with respect to the disc 1 (recording medium). The write/read unit is a constituent part including the optical pickup 51, the spindle motor 52, the thread mechanism 53, the matrix circuit 54, the reader/writer circuit 55, the modulation/demodulation circuit 56, the SCC encoder/decoder 57, the wobble circuit 58, the servo circuit 61, the spindle servo circuit 62, and the laser driver 63. In addition, the disc drive apparatus including the system controller 60 as a control unit. In response to an instruction to rewrite sector data from the host device 120, the system controller 60 instructs the write/read unit to generate write data in cluster units using update data relevant to the rewrite instruction and the recorded data, which has been read out from the disc 1, and to write the write data to the non-recording address on the disc 1 (LOW to perform RMW). In addition, the system controller 60 generates or updates replacement information (replacement entry) for associating the address at which the write data is written, as a replacement destination, with the address of the replacement source, and generates extended replacement information (first and second extension entries) including validity/invalidity information (sector bitmap) for each sector in the write data, as information linked to the replacement entry, according to the predetermined conditions shown as the rules (a), (b), and (c).

By recording the write data including the update data at different positions on the disc 1 from the recorded data and managing the replacement information, it is possible to rewrite data on the write once disc.

Here, the data writing of the write/read unit is performed in cluster units. However, in a case where there is an instruction to rewrite data in sector units from the host device 120, an recorded cluster is read out, valid sector data and sector data to be updated are merged to generate data in cluster units, and the generated data is written to the disc 1. This is the so-called RMW. At this time, even if cluster reading fails, valid sector data can be read out by accessing past replacement clusters in some cases. At the time of such sector data restoration, the DFL entry is referred to in the present embodiment. This is because a valid sector can be determined by the DFL entry.

Therefore, since it is not necessary to take the trouble to read out past clusters and determine a valid sector, the access efficiency for restoring sector data is significantly improved. In addition, therefore, since the read processing time in the RMW can be shortened, the response to the host device 120 is also improved.

In addition, in a case where recorded data required for generating data in cluster units cannot be read out in the reading (reading at the time of RMW) of recorded data in response to the rewrite instruction, the system controller 60 checks other addresses at which the required recorded data is recorded with reference to the extension entry, and controls the write/read unit to read out data from the other addresses (S110 to S113).

Since the address at which valid data as the required recorded data is recorded can be checked with reference to the extended replacement information, it is possible to efficiently try to read out the recorded data by checking other addresses even if the required recorded data cannot be read out from the address for which a rewrite instruction has been given.

In addition, the system controller 60 determines that a read error has occurred in a case where the recorded data required for generating write data in cluster units cannot be read out even if the reading from all other addresses that can be checked with the extended replacement information is performed (S117).

That is, in a case where the reading from the address for which a rewrite instruction has been given is unsuccessful, it is not determined that a read error has occurred by itself. Then, in a case where the reading from the address checked by the extension entry is further tried and the required recorded data cannot be obtained, it is determined that a read error has occurred. As a result, it is possible to avoid a read error as much as possible and to increase the possibility of data rewriting by the original RMW operation.

In addition, in a case where the reading of the required recorded data from the disc 1 is successful, the system controller 60 generates write date by combining the update data relevant to the rewrite instruction with the read recorded data (S103). On the other hand, in a case where it is determined that a read error has occurred, the update data relevant to the rewrite instruction and the invalid data are combined to generate write data in cluster units (S118).

As a result, even in a case where the required recorded data cannot be read out, at least the update data relevant to the rewrite instruction is written to the disc 1. That is, since the writing of update data designated by the host is executed even if the reading of the RMW fails, it is possible to improve recording reliability.

In addition, the system controller 60 generates an extension entry on condition that it is determined that a read error has occurred (S38, S39). This is the case of the above-described rules (a) and (c).

Even in a case where a read error occurs, assuming that the writing of rewrite data is performed, an extension entry is generated and registered for the address at which the read error of the RMW has occurred, so that the past recorded data can be traced thereafter. That is, in the most required case, an extension entry is generated.

In addition, in a case where there is an extension entry for recorded data for which reading has been unsuccessful, the system controller 60 maintains both the existing extended replacement information and the generated extended replacement information (S38).

By allowing new extended replacement information and existing extended replacement information to coexist, it is possible to read back the recorded data including the past read error.

In addition, in a case where the writing of write data, which is generated by combining the update data relevant to the rewrite instruction and the recorded data, to the disc 1 is performed, the system controller 60 generates an extension entry including validity/invalidity information (sector bitmap) of the existing extension entry and deletes the existing extension entry on condition that there is an extension entry for the recorded data (S34, S35). This is the processing in the case of the above-described rule (b).

This is to generate extended replacement information merged with existing extended replacement information so that recorded data can be traced including the past read error, in a case where the extended replacement information was generated in response to a read error in the past even if the reading of the recorded data is successful and rewriting can be appropriately executed. In this case, since the existing extended replacement information is not necessary, it is possible to improve the efficiency of the DFL entry and reduce the amount of data by deleting the existing extended replacement information.

In addition, in a case where a plurality of clusters whose addresses can be checked with reference to extension entries are physically continuous on the disc 1, the system controller 60 controls the write/read unit to continuously read out the data from the plurality of consecutive clusters (S121, S122).

If the clusters that can be traced back for the reading of the recorded data are physically continuous, access can be made more efficient by accessing and reading out the clusters at once.

In addition, the system controller 60 instructs the write/read unit to write the management data including the replacement entry and the extension entry to the disc 1.

For example, as described above, updating of the management information including the DFL entry may be performed on the cache memory 60a. However, at a predetermined timing, such as disc ejection or power off, the management information including the DFL entry may be written to the disc 1.

By writing the management data including the replacement entry and the extension entry to the disc 1, even in a case where the disc 1 is ejected and reloaded or loaded into another disc drive apparatus, it is possible to restore the sector data with reference to the DFL entry as shown in FIGS. 13 and 14.

In addition, the system controller 60 generates or updates the replacement entry so that the address of the latest replacement destination corresponds to the address of the replacement source in the first rewriting operation. In addition, as extension entries, a first extension entry including the PCN of the cluster, which is the replacement destination in the rewriting operation, and a sector bitmap in the PCN and a second extension entry including the PCN of the cluster, which is the replacement destination in the rewriting operation, and the replacement destination PCN at the time of LOW in which the RMW was successful previously in view of the current LOW are generated.

With this structure, a function as the replacement entry and the extension entry, in particular, a necessary minimum information storage function as information to be referred to for restoration of sector data is realized.

On the disc 1 as a recording medium of the present embodiment, a management information area (for example, an inner zone including the TDMA) is provided to record management data including a replacement entry for associating an address at which write data including update data is written by a data rewriting operation, as a replacement destination, with the address of the replacement source and an extension entry that is information linked to the replacement entry and that includes validity/invalidity information of sectors in a cluster as write data.

By forming a recording medium in which extension entries are recordable in the management information area, a recording apparatus can check the presence of valid recorded data for constructing update data or the address of the valid recorded data with reference to the management data at the time of data rewriting.

In addition, the management information structure on the disc 1 of the embodiment, for example, the format of the DFL entry or the type as the replacement entry and the extension entry is only an example. An information format may be applied by which at least the determination of valid sector data as management information or the checking of the address is possible at the time of RMW.

In addition, each process described in FIGS. 11, 13, 14, and 15 is also an example, and various modifications are naturally assumed.

The recording medium of the invention is a recording medium having various recording formats and shapes, such as a next-generation optical disc, a card medium, a hologram medium, and a volume type recording medium other than the BD, and can be applied as a write once type recording medium.

The recording apparatus and the recording method of the invention can be applied as a recording apparatus corresponding to the various recording media and a recording method thereof.

In addition, the effects described in this specification are only illustrative and are not limited, and there may be other effects.

In addition, the present technology can also adopt the following configuration.

(1) A recording apparatus, including:
a write/read unit capable of performing data writing in a second data unit, in which a plurality of first data units of a predetermined amount of data are consecutive, and data reading in the first data unit with respect to a recording medium; and a control unit that, in response to a rewrite instruction for data in the first data unit, instructs the write/read unit to generate write data in the second data unit using update data relevant to the rewrite instruction and recorded data read out from the recording medium and to write the write data at a non-recording address on the recording medium, generates or updates replacement information for associating an address at which the write data is written, as a replacement destination, with an address of a replacement source, and generates extended replacement information including validity/invalidity information for each piece of data in the first data unit in the write data, as information linked to the replacement information, according to predetermined conditions.

(2) The recording apparatus according to (1), in which, in a case where required recorded data cannot be read out in reading of recorded data from the recording medium in response to the rewrite instruction, the control unit checks other addresses at which the required recorded data is recorded with reference to the extended replacement information and controls the write/read unit to read out data from the other addresses.

(3) The recording apparatus according to (2), in which, in a case where recorded data required for generating the write data in the second data unit cannot be read out even if reading from all other addresses that can be checked with the extended replacement information is performed, the control unit determines that a read error has occurred.

(4) The recording apparatus according to (3), in which the control unit generates the write data in the second data unit by combining the update data relevant to the rewrite instruction and the read recorded data in a case where reading of the required recorded data from the recording medium is successful, and generates the write data in the second data unit by combining the update data relevant to the rewrite instruction and invalid data in a case where it is determined that the read error has occurred.

(5) The recording apparatus according to (4), in which the control unit generates the extended replacement information on condition that it is determined that the read error has occurred.

(6) The recording apparatus according to (5), in which the control unit maintains both existing extended replacement information and the generated extended replacement information in a case where there is extended replacement information for recorded data whose reading has been unsuccessful.

(7) The recording apparatus according to any of (4) to (6), in which, in a case where writing of the write data, which is generated by combining the update data relevant to the rewrite instruction and the recorded data, to the recording medium is performed, the control unit generates extended replacement information including the validity/invalidity information of existing extended replacement information and deletes the existing extended replacement information on condition that the extended replacement information for the recorded data is present.

(8) The recording apparatus according to any of (2) to (7), in which, in a case where a plurality of the second data units whose addresses can be checked with reference to the extended replacement information are physically, continuous on the recording medium, the control unit controls the write/read unit to continuously read out data from the plurality of consecutive second data units.

(9) The recording apparatus according to any of (1) to (8), in which the control unit instructs the write/read unit to write management data including the replacement management information and the extended replacement management information to the recording medium.

(10) The recording apparatus according to any of (1) to (9), in which the control unit generates or updates the replacement information so that an address of a latest replacement destination corresponds to an address of a replacement source in a first rewriting operation, and the control unit generates, as the extended replacement information, first extended replacement information including an address of the second data unit, which is a replacement destination in a rewriting operation, and validity/invalidity information of each piece of data of the first data unit in the second data unit and second extended replacement information including an address of the second data unit, which is a replacement destination in a rewriting operation, and an address of a replacement destination in a previous rewriting operation.

(11) A recording method of a recording apparatus including a write/read unit capable of performing data writing in a second data unit, in which, a plurality of first data units of a predetermined amount of data are consecutive, and data reading in the first data unit with respect to a recording medium, the method including:

a step in which, in response to a rewrite instruction for data in the first data unit, the write/read unit is instructed to generate write data in the second data unit using update data relevant to the rewrite instruction and recorded data read out from the recording medium and to write the write data at a non-recording address on the recording medium;

a step of generating or updating replacement information for associating an address at which the write data is written, as a replacement destination, with an address of a replacement source; and a step of generating extended replacement information including validity/invalidity information for each piece of data in the first data unit in the write data, as information linked to the replacement information, according to predetermined conditions.

(12) A recording medium in which user data and management data are recorded, data writing in a second data unit in which a plurality of first data units of a predetermined amount of data are consecutive is performed, and write data of the second data unit is written to a non-recording address by update data and recorded data at the time of rewriting data of the first data unit, in which a management information area is provided to record management data including replacement information for associating an address at which write data is written, as a replacement destination, with an address of a replacement source by a data rewriting operation, and extended replacement information, which is information linked to the replacement information and which includes validity/invalidity information for each piece of data of the first data unit in the write data.

REFERENCE SIGNS LIST

1 Disc
51 Optical pickup
52 Spindle motor

53 Thread mechanism
54 Matrix circuit
55 Reader/writer circuit
56 Modulation/demodulation circuit
57 ECC encoder/decoder
58 Wobble circuit
60 System controller
61 Servo circuit
62 Spindle servo circuit
63 Laser driver

The invention claimed is:

1. A recording apparatus, comprising:
a write/read unit capable of performing data writing in a second data unit, in which a plurality of first data units of a predetermined amount of data are consecutive, and data reading in the first data unit with respect to a recording medium; and
a control unit that, in response to a rewrite instruction for data in the first data unit, instructs the write/read unit to generate write data in the second data unit using update data relevant to the rewrite instruction and recorded data read out from the recording medium and to write the write data at a non-recording address on the recording medium, generates or updates replacement information for associating an address at which the write data is written, as a replacement destination, with an address of a replacement source, and generates extended replacement information including validity/invalidity information for each piece of data in the first data unit in the write data, as information linked to the replacement information, according to predetermined conditions,
wherein, in a case where required recorded data cannot be read out in reading of recorded data from the recording medium in response to the rewrite instruction, the control unit checks other addresses at which the required recorded data is recorded with reference to the extended replacement information and controls the write/read unit to read out data from the other addresses,
wherein, in a case where recorded data required for generating the write data in the second data unit cannot be read out even if reading from all other addresses that can be checked with the extended replacement information is performed, the control unit determines that a read error has occurred,
wherein the control unit generates the write data in the second data unit by combining the update data relevant to the rewrite instruction and the read recorded data in a case where reading of the required recorded data from the recording medium is successful, and generates the write data in the second data unit by combining the update data relevant to the rewrite instruction and invalid data in a case where it is determined that the read error has occurred, and
wherein, in a case where writing of the write data, which is generated by combining the update data relevant to the rewrite instruction and the recorded data, to the recording medium is performed, the control unit generates extended replacement information including the validity/invalidity information of existing extended replacement information and deletes the existing extended replacement information on condition that the extended replacement information for the recorded data is present.

2. The recording apparatus according to claim 1, wherein the control unit generates the extended replacement information on condition that it is determined that the read error has occurred.

3. The recording apparatus according to claim 2, wherein the control unit maintains both existing extended replacement information and the generated extended replacement information in a case where there is extended replacement information for recorded data whose reading has been unsuccessful.

4. The recording apparatus according to claim 1, wherein, in a case where a plurality of the second data units whose addresses can be checked with reference to the extended replacement information are physically continuous on the recording medium, the control unit controls the write/read unit to continuously read out data from the plurality of consecutive second data units.

5. The recording apparatus according to claim 1, wherein the control unit instructs the write/read unit to write management data including the replacement management information and the extended replacement management information to the recording medium.

6. The recording apparatus according to claim 1, wherein the control unit generates or updates the replacement information so that an address of a latest replacement destination corresponds to an address of a replacement source in a first rewriting operation, and
the control unit generates,
as the extended replacement information,
first extended replacement information including an address of the second data unit, which is a replacement destination in a rewriting operation, and validity/invalidity information of each piece of data of the first data unit in the second data unit and
second extended replacement information including an address of the second data unit, which is a replacement destination in a rewriting operation, and an address of a replacement destination in a previous rewriting operation.

7. A recording method of a recording apparatus including a write/read unit capable of performing data writing in a second data unit, in which a plurality of first data units of a predetermined amount of data are consecutive, and data reading in the first data unit with respect to a recording medium, the method comprising:
a step in which, in response to a rewrite instruction for data in the first data unit, the write/read unit is instructed to generate write data in the second data unit using update data relevant to the rewrite instruction and recorded data read out from the recording medium and to write the write data at a non-recording address on the recording medium;
a step of generating or updating replacement information for associating an address at which the write data is written, as a replacement destination, with an address of a replacement source;
a step of generating extended replacement information including validity/invalidity information for each piece of data in the first data unit in the write data, as information linked to the replacement information, according to predetermined conditions;
a step in which, in a case where required recorded data cannot be read out in reading of recorded data from the recording medium in response to the rewrite instruction, other addresses at which the required recorded data is recorded are checked with reference to the extended replacement information and the write/read unit reads out data from the other addresses;

a step in which, in a case where recorded data required for generating the write data in the second data unit cannot be read out even if reading from all other addresses that can be checked with the extended replacement information is performed, it is determined that a read error has occurred;

a step of generating the write data in the second data unit by combining the update data relevant to the rewrite instruction and the read recorded data in a case where reading of the required recorded data from the recording medium is successful;

a step of generating the write data in the second data unit by combining the update data relevant to the rewrite instruction and invalid data in a case where it is determined that the read error has occurred; and a step in which, in a case where writing of the write data, which is generated by combining the update data relevant to the rewrite instruction and the recorded data to the recording medium is performed, extended replacement information including the validity/invalidity information of existing extended replacement information is generated and the existing extended replacement information is deleted on condition that the extended replacement information for the recorded data is present.

* * * * *